(12) United States Patent
Shimizu et al.

(10) Patent No.: US 12,285,901 B2
(45) Date of Patent: Apr. 29, 2025

(54) COMPOSITE MATERIAL STRUCTURE BODY PRODUCTION METHOD, LAYERED BODY PRODUCTION METHOD, LAYERED BODY, AND LAYERED FORM

(71) Applicant: MITSUBISHI HEAVY INDUSTRIES, LTD., Tokyo (JP)

(72) Inventors: Masahiko Shimizu, Tokyo (JP); Toshiki Kitazawa, Tokyo (JP); Shoya Mano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 210 days.

(21) Appl. No.: 17/797,476

(22) PCT Filed: Jul. 6, 2020

(86) PCT No.: PCT/JP2020/026484
§ 371 (c)(1),
(2) Date: Aug. 4, 2022

(87) PCT Pub. No.: WO2021/157106
PCT Pub. Date: Aug. 12, 2021

(65) Prior Publication Data
US 2023/0071796 A1     Mar. 9, 2023

(30) Foreign Application Priority Data
Feb. 7, 2020   (WO) ................. PCT/JP2020/004922

(51) Int. Cl.
*B29C 53/04*     (2006.01)
*B29C 70/30*     (2006.01)
(Continued)

(52) U.S. Cl.
CPC .............. *B29C 53/04* (2013.01); *B29C 70/30* (2013.01); *B29K 2307/04* (2013.01); *B29K 2309/08* (2013.01)

(58) Field of Classification Search
None
See application file for complete search history.

(56) References Cited

U.S. PATENT DOCUMENTS 9,440,401 B1    9/2016  Nelson
10,105,940 B2   10/2018 Chapman et al.
(Continued)

FOREIGN PATENT DOCUMENTS

JP    H0671742 A     3/1994
JP    2010120167 A   6/2010
JP    5260593 B2     8/2013

OTHER PUBLICATIONS

International Search Report and Written Opinion of International Application No. PCT/JP2020/026484 mailed Sep. 24, 2020; 11pp.
(Continued)

*Primary Examiner* — Michael N Orlando
*Assistant Examiner* — Abhishek A Patwardhan
(74) *Attorney, Agent, or Firm* — HAUPTMAN HAM, LLP

(57) ABSTRACT

A composite material structure body production method includes a layering step of layering a plurality of fiber sheets to form a layered body having a deforming portion extending in one direction, and a forming step of performing bend-forming along a deforming line contained in the deforming portion and extending in the one direction, thereby causing the deforming portion to deform. The layering step produces the layered body in such a manner that the shape of the deforming portion is a shape wherein: the cross-section shape in the one direction and the cross-section shape in an intersecting direction that intersects with the one (Continued)

direction are bent or curved; and the length in the intersecting direction changes along the one direction.

6 Claims, 17 Drawing Sheets

(51) Int. Cl.
*B29K 307/04* (2006.01)
*B29K 309/08* (2006.01)

(56) References Cited

U.S. PATENT DOCUMENTS

| | | | |
|---|---|---|---|
| 2005/0029707 A1 | 2/2005 | Kasai et al. | |
| 2006/0083806 A1 | 4/2006 | Kasai et al. | |
| 2006/0216480 A1* | 9/2006 | Weidmann | B29C 70/32 156/221 |
| 2006/0252334 A1* | 11/2006 | LoFaro | B32B 7/10 442/361 |
| 2010/0285265 A1* | 11/2010 | Shinoda | B32B 5/022 428/80 |
| 2010/0319841 A1* | 12/2010 | Rubin | B29C 70/525 156/228 |

OTHER PUBLICATIONS

Extended European Search Report for European Application No. 20917908.4 mailed May 30, 2023; 10pp.

* cited by examiner

COMPOSITE MATERIAL STRUCTURE BODY PRODUCTION METHOD, LAYERED BODY PRODUCTION METHOD, LAYERED BODY, AND LAYERED FORM

RELATED APPLICATIONS

The present application is a National Phase of International Application Number PCT/JP2020/026484 filed Jul. 6, 2020 and claims priority to Japanese Application Number PCT/JP2020/004922 filed Feb. 7, 2020.

TECHNICAL FIELD

The present disclosure relates to a method for producing a composite structure, a method for producing a laminate, a laminate, and a lamination tool.

BACKGROUND ART

A composite material, for example, carbon fiber reinforcement plastic (CFRP) is used for aircraft components such as a fuselage and a main wing of an aircraft. A CFRP structural member (composite structure) forming the aircraft components has an arbitrary cross-sectional shape. As one of methods for producing such a composite structure, there is a method in which a plurality of fiber sheets (prepregs or the like) are laminated to fabricate a flat laminate (also referred to as a charge) of the fiber sheets and bending forming is performed on the laminate to provide an arbitrary cross-sectional shape (for example, refer to PTL 1).

PTL 1 discloses a concept that a composite structure is produced by performing bending forming on a laminate. In addition, in PTL 1, the amount of a material to be laminated when the laminate is fabricated is increased at a location where the laminate is expected to be in excess of the fibers when bent.

CITATION LIST

Patent Literature

[PTL 1] U.S. Pat. No. 10,105,940

SUMMARY OF INVENTION

Technical Problem

In a case where a bending line is bent or curved when bending forming is performed on the laminate, a state where a partial region of the laminate is in excess of the fibers (hereinafter, also referred to as a "fiber excess state") or a state where a partial region of the laminate is in shortage of the fibers (hereinafter, also referred to as a "fiber shortage state") may occur. In accordance with the above, as indicated by arrows in FIG. 33, a compressive force acts on the laminate in a region that is in excess of the fibers. In addition, as indicated by arrows in FIG. 34, a tensile force acts on the laminate in a region that is in shortage of the fibers. When a compressive force or a tensile force acts on the laminate, there is a possibility that wrinkles are easily generated in the laminate. When wrinkles are generated in the laminate, there is a possibility that the strength of the composite structure is reduced.

In PTL 1, the amount of the material to be laminated when the laminate is fabricated is increased at a location where the laminate is expected to be in shortage of the fibers when bent. In PTL 1, a portion in which the amount of the material is increased is shaped to protrude in a thickness direction. However, since the shape of the portion in which the amount of the material is increased is not a shape corresponding to the composite structure, in the method of PTL 1, when bending forming is performed, there is a possibility that wrinkles are generated in the portion in which the amount of the material is increased.

The present disclosure has been conceived in view of such circumstances, and an object of the present disclosure is to provide a method for producing a composite structure, a method for producing a laminate, a laminate, and a lamination tool capable of suppressing wrinkles to be generated in the laminate during bending forming.

Solution to Problem

In order to solve the above problem, a method for producing a composite structure, a method for producing a laminate, a laminate, and a lamination tool according to the present disclosure adopt the following means.

According to one aspect of the present disclosure, there is provided a method for producing a composite structure includes: a lamination step of laminating a plurality of fiber sheets to fabricate a laminate including a deformable portion extending in one direction; and a forming step of performing bending forming along a deformation line included in the deformable portion and extending in the one direction, to deform the deformable portion. In the lamination step, the laminate is fabricated such that the deformable portion has a shape in which a shape of a cross section in the one direction and a shape of a cross section in an intersecting direction intersecting the one direction is bent or curved and a length in the intersecting direction changes along the one direction.

In addition, according to one aspect of the present disclosure, there is provided a laminate that is fabricated by laminating a plurality of fiber sheets and that is processed into a composite structure by being subjected to bending forming, the laminate including: a deformable portion which extends in one direction and in which a shape of a cross section in the one direction and a shape of a cross section in an intersecting direction intersecting the one direction is bent or curved and a length in the intersecting direction changes along the one direction.

Advantageous Effects of Invention

According to the present disclosure, it is possible to suppress wrinkles to be generated in the laminate during bending forming.

DESCRIPTION OF EMBODIMENTS

Figure 1:
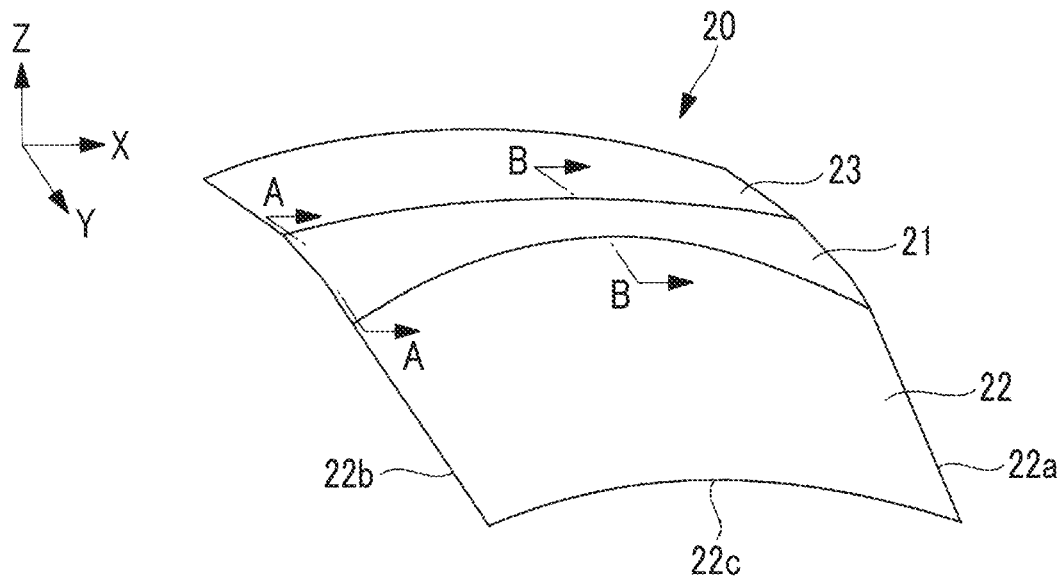
FIG. 1 is a perspective view illustrating a laminate according to a first embodiment of the present disclosure.

Hereinafter, one embodiment of a method for producing a composite structure, a method for producing a laminate, a laminate, and a lamination tool according to the present disclosure will be described with reference to the drawings.

First Embodiment

A first embodiment of the present disclosure will be described with reference to FIGS. 1 to 7. In the present embodiment, first, a laminate 20 (refer to FIG. 1) that is an intermediate formed article is fabricated by laminating fiber sheets while shaping the fiber sheets. Then, a composite structure 40 that is a formed article having a final shape is produced by additionally performing bending forming on the fabricated laminate 20 (refer to FIGS. 4 and 5). The composite structure 40 is, for example, a stringer, a spar, a frame, a rib, or the like that is an aircraft component forming an aircraft structure. Incidentally, an example of the fiber sheet is a prepreg.

Incidentally, in the following description, a thickness direction (laminating direction) of the laminate 20 will be described as a Z-axis direction, one of directions including planes orthogonal to the Z-axis direction will be described as an X-axis direction, and a direction orthogonal to the Z-axis direction and to the X-axis direction will be described as a Y-axis direction. In the present embodiment, since an example will be described in which the Z-axis direction is an up-down direction, the Z-axis direction may be described as the up-down direction.

The fiber sheet has a tape shape that is long in a predetermined direction. A length of the fiber sheet in a lateral direction is shorter than a length of the laminate 20 in the X-axis direction and than a length of the laminate 20 in the Y-axis direction. The fiber sheet includes a fiber preform in which a direction of arrangement of fibers (hereinafter, referred to as a "fiber direction") is arranged to be parallel to a longitudinal direction of the fiber sheet, and a resin impregnated in the fiber preform. Any fiber such as a carbon fiber or a glass fiber is used for the fiber preform. For example, thermosetting resins to be cured by heating, such as epoxy resin, polyimide, polyurethane, and unsaturated polyester can be used as the resin to be infiltrated in the fiber preform. In addition, thermoplastic resins to be solidified by heating, such as polyamide, polyethylene, polystyrene, and polyvinyl chloride can be used. Incidentally, the fiber sheet is not limited to the fiber sheet described above. For example, a dry fiber sheet that can be shaped can be used. In addition, for example, the fiber direction may be a direction that is not parallel to the longitudinal direction of the sheet. In addition, in the present embodiment, an example will be described in which the fiber sheet has a tape shape, but the shape of the fiber sheet is not limited thereto.

The laminate 20 is fabricated (produced) as follows. First, a lowermost layer of the laminate 20 is formed by placing a fiber sheet on a lamination surface 11 of a lamination tool 10

(refer to FIG. 6) without a gap therebetween. Next, a fiber sheet is placed on an upper surface of the fiber sheet forming the lowermost layer without a gap therebetween. Namely, the fiber sheet of the next layer is laminated on the fiber sheet of the lowermost layer. Next, a fiber sheet of a next layer is laminated on the fiber sheet of an uppermost layer. The laminate 20 is fabricated by repeating this process a predetermined number of times (lamination step). Means for laminating the fiber sheets on the lamination tool 10 is not particularly limited. For example, lamination may be performed by a laminating device or lamination may be manually performed. In addition, when the fiber sheets are placed, the fiber sheets may be placed to form a slight gap between adjacent fiber sheets.

Figure 6:
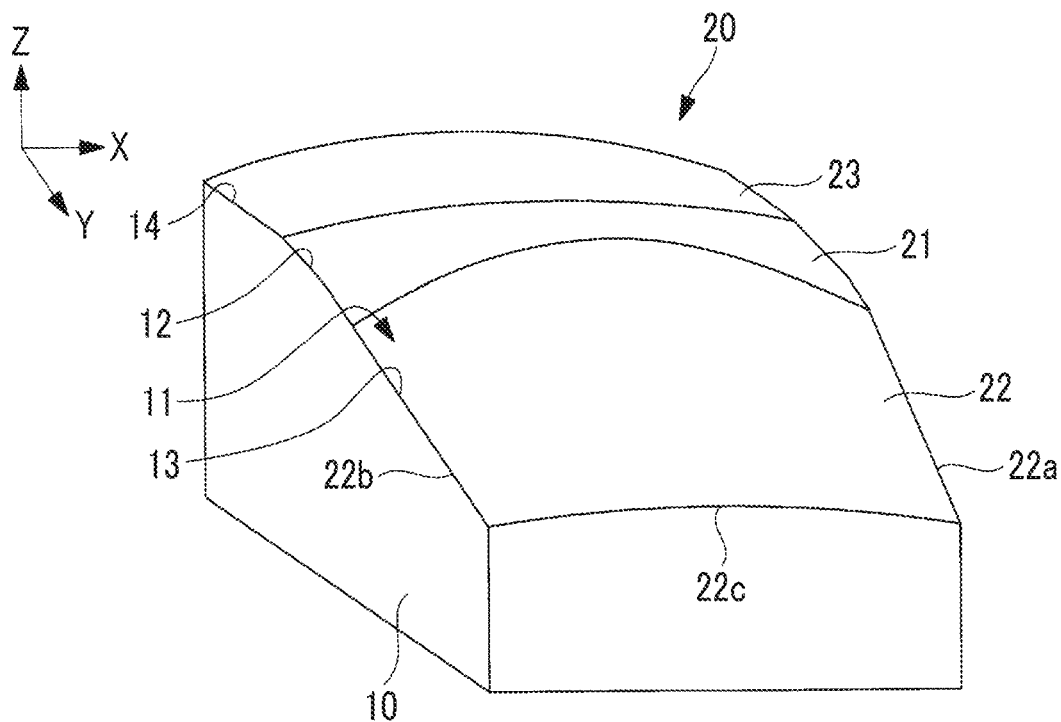
FIG. 6 is a perspective view illustrating a lamination tool and the laminate according to the first embodiment of the present disclosure.

As illustrated in FIG. 6, the lamination tool 10 is a block-shaped member, and an upper surface of the lamination tool 10 is the lamination surface 11. The lamination surface 11 has a shape corresponding to the shape of the laminate 20 to be fabricated. In detail, the lamination surface 11 has a first surface portion 12 (curved surface portion) corresponding to a deformable portion 21 of the laminate 20 to be described later; a second surface portion 13 that curves and extends diagonally downward from one end portion of the first surface portion 12 in the Y-axis direction; and a third surface portion 14 that curves and extends diagonally upward from the other end portion (end portion opposite to the one end portion) of the first surface portion 12 in the Y-axis direction. The first surface portion 12, the second surface portion 13, and the third surface portion 14 are continuously connected to each other without going through a step portion or the like.

When the laminate 20 is fabricated, the deformable portion 21 of the laminate 20 is placed on the first surface portion 12. Namely, the first surface portion 12 has a shape corresponding to the deformable portion 21 of the laminate 20. The first surface portion 12 is curved so that a cross section when cut along a plane orthogonal to the X-axis direction (hereinafter, referred to as a "cross section in the X-axis direction") protrudes upward. In addition, the first surface portion 12 is curved so that a cross section when cut along a plane orthogonal to the Y-axis direction (hereinafter, referred to as a "cross section in the Y-axis direction") protrudes upward. In addition, the length of the first surface portion 12 in the Y-axis direction increases from a central portion toward both end portions in the X-axis direction. Namely, in the first surface portion 12, a length in the Y-axis direction at both the end portions in the X-axis direction is longer than a length in the Y-axis direction at the central portion in the X-axis direction. In addition, in the first surface portion 12, the radius of curvature of a cross section in the X-axis direction increases from the central portion toward both the end portions in the X-axis direction. Namely, in the first surface portion 12, a radius of curvature of the cross section in the X-axis direction at both the end portions in the X-axis direction is larger than a radius of curvature of the cross section in the X-axis direction at the central portion in the X-axis direction.

When the laminate 20 is fabricated, a first adjacent portion 22 of the laminate 20 to be described later is placed on the second surface portion 13. Namely, the second surface portion 13 has a shape corresponding to the first adjacent portion 22 of the laminate 20. The second surface portion 13 is curved so that a cross section in the Y-axis direction protrudes upward.

When the laminate 20 is fabricated, a second adjacent portion 23 of the laminate 20 to be described later is placed on the third surface portion 14. Namely, the third surface portion 14 has a shape corresponding to the second adjacent portion 23 of the laminate 20. The third surface portion 14 is curved so that a cross section in the Y-axis direction protrudes upward.

Incidentally, the shape of the lamination tool is not limited to the above shape of the lamination tool 10. The shape of the lamination tool has a shape corresponding to the shape of the laminate to be fabricated. For example, when the first adjacent portion of the laminate to be fabricated has a flat plate shape, the second surface portion may have a planar shape. In addition, when the second adjacent portion of the laminate to be fabricated has a flat plate shape, the third surface portion may have a planar shape.

As illustrated in FIG. 1, the laminate 20 includes the deformable portion 21 provided at a central portion in the Y-axis direction; the first adjacent portion 22 that curves and extends diagonally downward from one end portion of the deformable portion 21 in the Y-axis direction; and the second adjacent portion 23 that curves and extends diagonally downward from the other end portion of the deformable portion 21 in the Y-axis direction.

Figure 2:
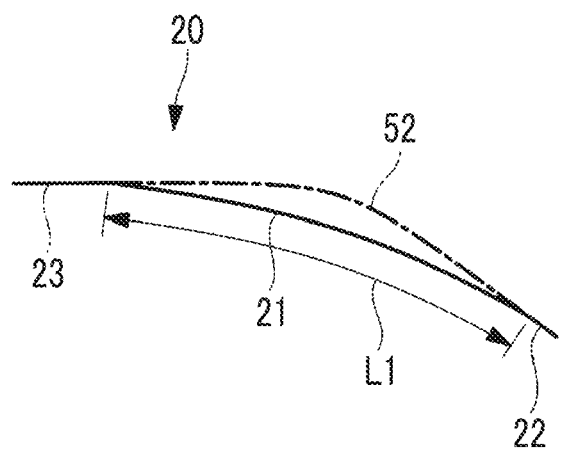
FIG. 2 is a cross-sectional view illustrating a cross section taken along line A-A of FIG. 1.
Figure 3:
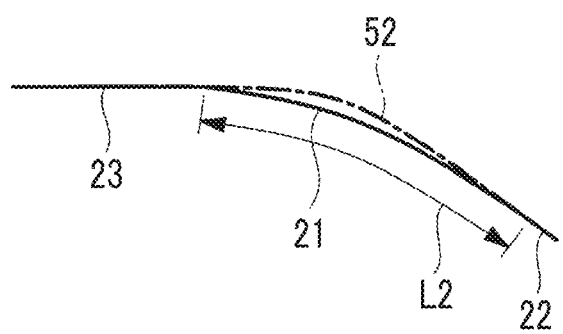
FIG. 3 is a cross-sectional view illustrating a cross section taken along line B-B of FIG. 1.
Figure 4:
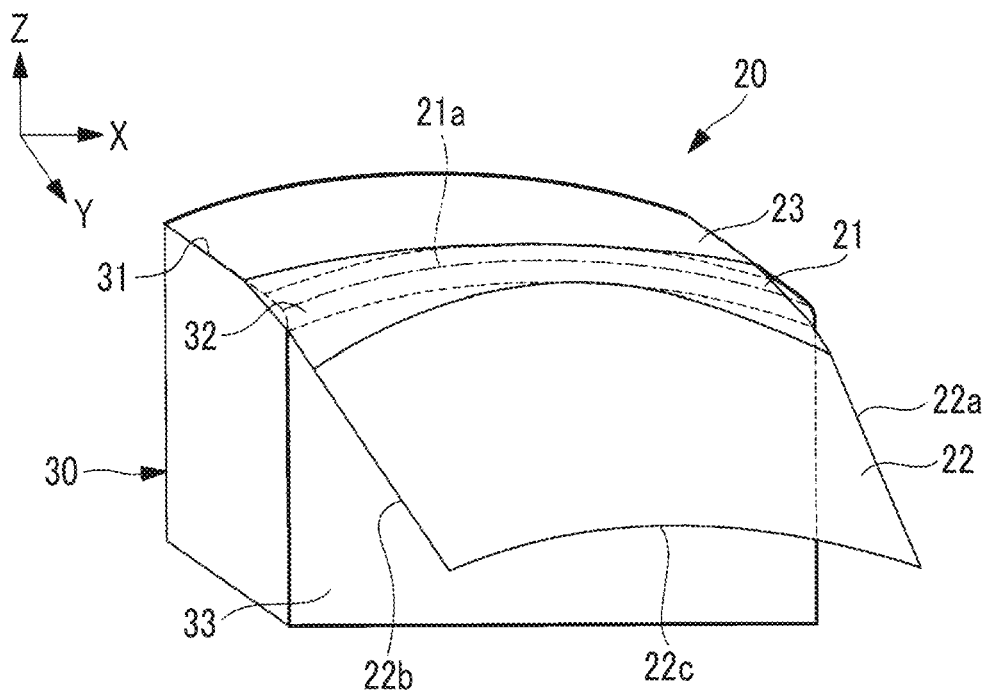
FIG. 4 is a perspective view illustrating a forming tool and the laminate according to the first embodiment of the present disclosure.

As illustrated in FIG. 6, when the laminate 20 is fabricated, the deformable portion 21 is located on the first surface portion 12. Namely, the deformable portion 21 has a shape corresponding to the first surface portion 12. In detail, as illustrated in FIG. 1, the deformable portion 21 is curved so that a cross section in the X-axis direction protrudes upward. As illustrated in FIG. 4, the deformable portion 21 includes a deformation line 21a that is an imaginary line extending in the X-axis direction. The deformation line 21a is curved to protrude upward. In addition, as illustrated in FIG. 1, the deformable portion 21 is curved so that a cross section in the Y-axis direction protrudes upward. In addition, the length of the deformable portion 21 in the Y-axis direction changes along the X-axis direction. Specifically, the length of the deformable portion 21 in the Y-axis direction increases from the central portion toward both the end portions in the X-axis direction. Namely, as illustrated in FIGS. 2 and 3, in the deformable portion 21, a length (circumferential length) L1 in the Y-axis direction at both the end portions in the X-axis direction is longer than a length (circumferential length) L2 in the Y-axis direction at the central portion in the X-axis direction. Incidentally, the length L1 and the length L2 mean lengths in the Y-axis direction along the shape of the laminate 20. In addition, in the following description, the length in the Y-axis direction along the shape of the laminate 20 may be referred to as a "circumferential length".

In addition, in the present embodiment, also in a plan view, in the deformable portion 21, a length in the Y-axis direction at both the end portions in the X-axis direction is longer than a length in the Y-axis direction at the central portion in the X-axis direction.

In addition, in the deformable portion 21, the radius of curvature of the cross section in the X-axis direction increases from the central portion toward both the end portions in the X-axis direction. Namely, in the deformable portion 21, a radius of curvature of the cross section in the X-axis direction at both the end portions in the X-axis direction is larger than a radius of curvature of the cross section in the X-axis direction at the central portion in the X-axis direction.

As illustrated in FIG. 6, when the laminate 20 is fabricated, the first adjacent portion 22 is located on the second surface portion 13. Namely, the first adjacent portion 22 has a shape corresponding to the second surface portion 13. In detail, as illustrated in FIG. 1, the first adjacent portion 22 is curved so that a cross section in the Y-axis direction protrudes upward. In addition, both end portions 22a and 22b of the first adjacent portion 22 in the X-axis direction are inclined such that both the end portions 22a and 22b approach each other toward one end portion 22c (end portion opposite to an end portion connected to the deformable portion 21) in the Y-axis direction. In addition, the one end portion 22c of the first adjacent portion 22 in the Y-axis direction is curved so that the central portion in the X-axis direction is located on the other side in the Y-axis direction with respect to both the end portions 22a and 22b in the X-axis direction.

As illustrated in FIG. 6, when the laminate 20 is fabricated, the second adjacent portion 23 is located on the third surface portion 14. Namely, the second adjacent portion 23 has a shape corresponding to the third surface portion 14. In detail, as illustrated in FIG. 1, the second adjacent portion 23 is curved so that a cross section in the Y-axis direction protrudes upward.

Incidentally, the shape of the laminate is not limited to the above shape of the laminate 20. The shape of the laminate has a shape corresponding to the shape of a composite structure to be produced. For example, the first adjacent portion and the second adjacent portion may have a planar shape, or may be curved so that both the cross section in the Y-axis direction and the cross section in the X-axis direction protrude upward. In addition, both the end portions of the first adjacent portion in the X-axis direction may not be inclined, and the one end portion of the first adjacent portion in the Y-axis direction may not be curved.

Figure 5:
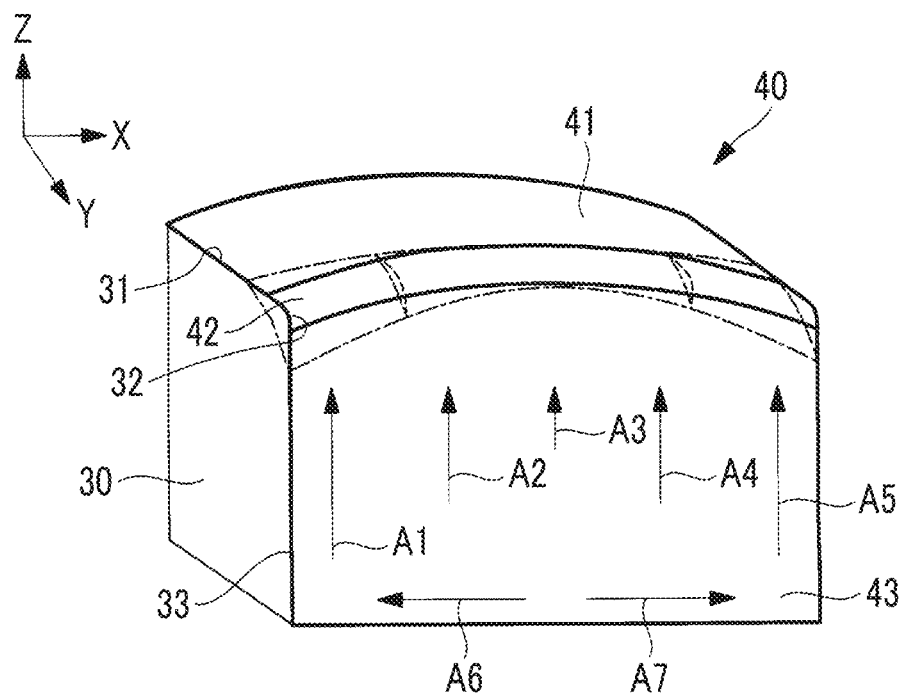
FIG. 5 is a perspective view illustrating a composite structure and the forming tool according to the first embodiment of the present disclosure.

As illustrated in FIG. 5, the fabricated laminate 20 is processed into the composite structure 40 by being subjected to bending forming. A method for performing bending forming on the laminate 20 is not particularly limited. For example, bending forming may be performed by roller forming or press forming. Hereinafter, as one example, a method for performing bending forming on the laminate 20 using a forming tool 30 will be described.

As illustrated in FIG. 4, the forming tool 30 includes a placement portion 31 which extends substantially horizontally and on which the laminate 20 is placed; a curved portion 32 extending to curve downward from one end portion of the placement portion 31 in the Y-axis direction; and a vertical portion 33 extending substantially vertically from a lower end portion of the curved portion 32.

When bending forming is performed on the laminate 20, in a state where the second adjacent portion 23 of the laminate 20 is placed on the placement portion 31 of the forming tool 30, the laminate 20 is pressed such that the entire regions of the deformable portion 21 and of the first adjacent portion 22 abut on the curved portion 32 and on the vertical portion 33, respectively (forming step). Accordingly, as illustrated in FIG. 5, the first adjacent portion 22, the deformable portion 21, and the second adjacent portion 23 have shapes along the placement portion 31, the curved portion 32, and the vertical portion 33, respectively. The laminate 20 is pressed in such a manner to produce the composite structure 40. The deformable portion 21 of the laminate 20 becomes a connecting portion 42 of the composite structure 40. In addition, the first adjacent portion 22 of the laminate 20 becomes a side surface portion 43 of the composite structure 40. In addition, the second adjacent portion 23 of the laminate 20 becomes an upper surface portion 41 of the composite structure 40.

In such a manner, bending forming is performed on the laminate 20. Incidentally, during the bending forming, the laminate 20 is processed to be bent along the deformation line 21a extending in the X-axis direction included in the deformable portion 21. Therefore, the deformable portion 21 is mainly deformed by performing bending forming. The deformation line 21a is an imaginary line included in the deformable portion 21, and is a line curved along the shape of the deformable portion 21.

As described above, during bending forming, the second adjacent portion 23 of the laminate 20 is placed on the placement portion 31. For this reason, an upper surface of the placement portion 31 has a shape corresponding to the shape of the second adjacent portion 23. In detail, the upper surface of the placement portion 31 is curved so that a cross section in the Y-axis direction protrudes upward.

The curved portion 32 connects one end portion of the placement portion 31 in the Y-axis direction and an upper end portion of the vertical portion 33. A cross section in the X-axis direction at an upper surface (surface on which the deformable portion 21 abuts) of the curved portion 32 is curved. In detail, the upper surface of the curved portion 32 has an arc shape of 90 degrees in which the cross section in the X-axis direction protrudes upward over the entire region in the X-axis direction. Incidentally, the shape of the cross section in the X-axis direction at the curved portion is not limited thereto. The shape of the cross section in the X-axis direction at the curved portion may be an arc shape of an angle smaller than 90 degrees or an arc shape of an angle larger than 90 degrees. The shape of the cross section in the X-axis direction at the curved portion is determined by the shape of the composite structure to be produced.

In addition, a radius of curvature of the upper surface of the curved portion 32 is substantially the same as the radius of curvature of the central portion in the X-axis direction in the deformable portion 21 over the entire region in the X-axis direction. The radius of curvature of the deformable portion 21 is at its smallest at the central portion in the X-axis direction. For this reason, a radius of curvature of regions other than the central portion in the X-axis direction in the deformable portion 21 is larger than the radius of curvature of the upper surface of the curved portion 32. The regions other than the central portion in the X-axis direction in the deformable portion 21 are, for example, both the end portions of the deformable portion 21 in the X-axis direction. Incidentally, the radius of curvature of the upper surface of the curved portion may be different from the radius of curvature of the central portion in the X-axis direction in the deformable portion 21.

A side surface (surface on which the first adjacent portion 22 abuts) of the vertical portion 33 is a flat surface. The upper end portion of the vertical portion 33 is curved along the shape of the curved portion 32.

Incidentally, the shape of the forming tool is not limited to the above shape of the forming tool 30. For example, in the side surface of the vertical portion, a Z-axis direction cross section may be curved or a cross section in the X-axis direction may be curved.

As illustrated in FIG. 5, the composite structure 40 produced from the laminate 20 is a member having a cross section in the X-axis direction of a substantially L shape and including the upper surface portion 41, the connecting portion 42 that is curved downward from one end portion of the upper surface portion 41 in the Y-axis direction, and the side surface portion 43 extending substantially vertically from a lower end portion of the connecting portion 42. Incidentally, in FIG. 5, the deformable portion 21 of the laminate 20 is illustrated by alternate long and short dash lines.

The upper surface portion 41 is a portion corresponding to the second adjacent portion 23 (refer to FIG. 4) before bending forming is performed. In addition, the upper surface portion 41 has a shape corresponding to the upper surface of the placement portion 31. Specifically, the upper surface portion 41 is curved so that a cross section in the Y-axis direction protrudes upward.

The connecting portion 42 is a portion corresponding to the deformable portion 21 (refer to FIG. 4) before bending forming is performed. The connecting portion 42 connects the one end portion of the upper surface portion 41 in the Y-axis direction and an upper end portion of the side surface portion 43. The connecting portion 42 has a shape corresponding to the curved portion 32, and has an arc shape of 90 degrees in which a cross section in the X-axis direction protrudes upward.

In addition, the connecting portion 42 has the same radius of curvature as the radius of curvature of the central portion in the X-axis direction in the deformable portion 21 over the entire region in the X-axis direction. Incidentally, the radius of curvature of the connecting portion may be different from the radius of curvature of the central portion in the X-axis direction in the deformable portion 21.

The side surface portion 43 is a portion corresponding to the first adjacent portion 22 (refer to FIG. 4) before bending forming is performed. The side surface portion 43 has a shape corresponding to the side surface of the vertical portion 33. Specifically, the upper end portion is curved along the shape of the connecting portion 42.

Incidentally, the composite structure is not limited to the above shape of the composite structure 40. For example, in the connecting portion, the cross section in the X-axis direction may have an arc shape of an angle smaller than 90 degrees or an arc shape of an angle larger than 90 degrees.

Next, a method for producing the composite structure 40 will be described with reference to FIG. 7.

Figure 7:
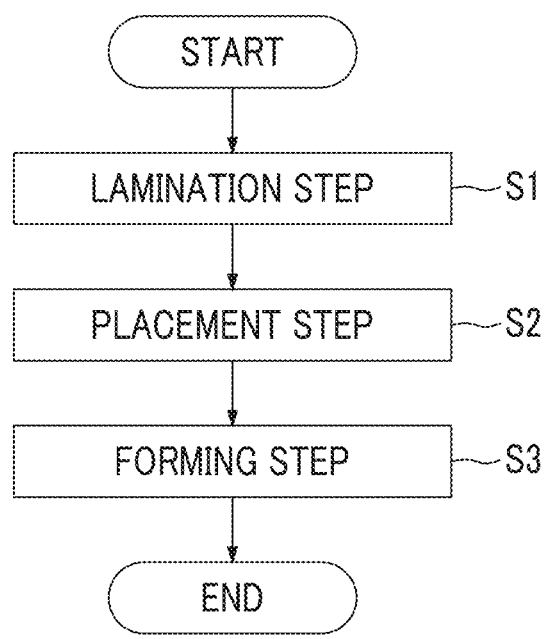
FIG. 7 is a flowchart illustrating a composite structure production method according to the first embodiment of the present disclosure.

First, as illustrated in step S1 of FIG. 7, the laminate 20 is fabricated by laminating fiber sheets on the lamination tool 10 (lamination step). At this time, the laminate 20 is fabricated to include the deformable portion 21, the first adjacent portion 22, and the second adjacent portion 23 described above. When the lamination step is completed, the process proceeds to step S2.

In step S2, the fabricated laminate 20 is placed on the forming tool 30 (placement step). At this time, the second adjacent portion 23 of the laminate 20 is placed on the placement portion 31 of the forming tool 30. When the placement step is completed, the process proceeds to step S3.

In step S3, the laminate 20 is pressed such that the entire regions of the deformable portion 21 and of the first adjacent portion 22 in the laminate 20 abut on the curved portion 32 and on the vertical portion 33 in the forming tool 30, respectively. Accordingly, the laminate 20 is bent along the deformation line 21a. In such a manner, bending forming is performed along the deformation line 21a included in the deformable portion 21, to deform the deformable portion 21 (forming step). At this time, the deformable portion 21 is formed to be bent in a direction opposite to a direction in which the cross section in the Y-axis direction at the deformable portion 21 protrudes.

In such a manner, the composite structure 40 is produced. Incidentally, the method for producing the composite structure 40 described in the present embodiment is one example, and the present disclosure is not limited thereto.

According to the present embodiment, the following effects are exhibited.

In the case of performing bending forming on a laminate other than the laminate 20 according to the present embodiment, when a deformable portion (deformation line) in which the shape of a cross section in the Y-axis direction is bent or curved is bent, there is a possibility of occurrence of a state where the laminate is in excess of fibers in a region adjacent to the deformable portion in the Y-axis direction (hereinafter, also referred to as a "fiber excess state") or of a state where the laminate is in shortage of the fibers therein (hereinafter, also referred to as a "fiber shortage state"). In accordance with the above, when a fiber excess state occurs, a compressive force along the X-axis direction acts in a partial region of the laminate. In addition, when a fiber shortage state occurs, a tensile force along the X-axis direction acts in a partial region of the laminate. When a compressive force or a tensile force along the X-axis direction acts, there is a possibility that wrinkles are generated in the laminate. When wrinkles are generated in the laminate, there is a possibility that the strength of the composite structure is reduced.

Figure 31:
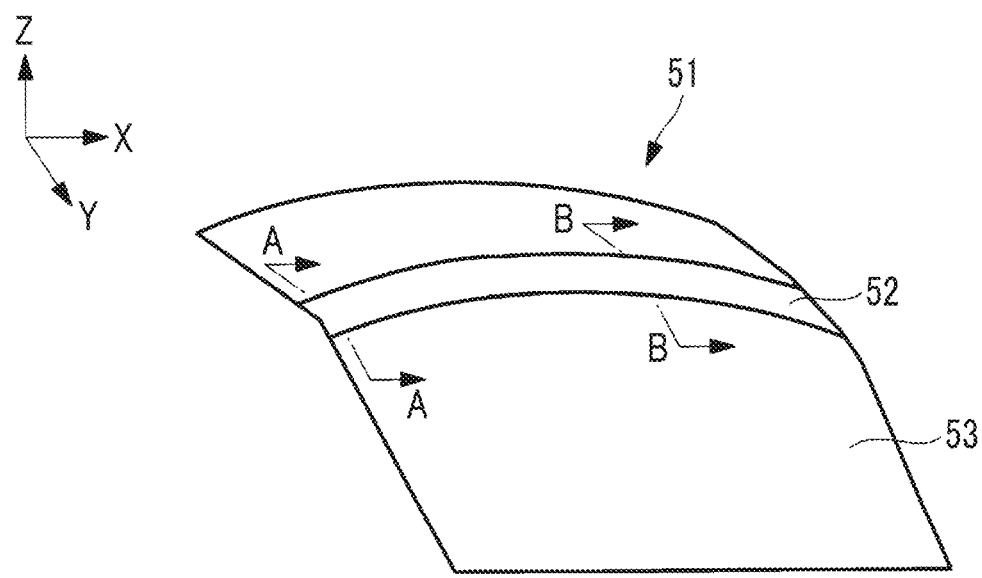
FIG. 31 is a perspective view illustrating a laminate according to a comparative example of the first embodiment of the present disclosure.
Figure 32:
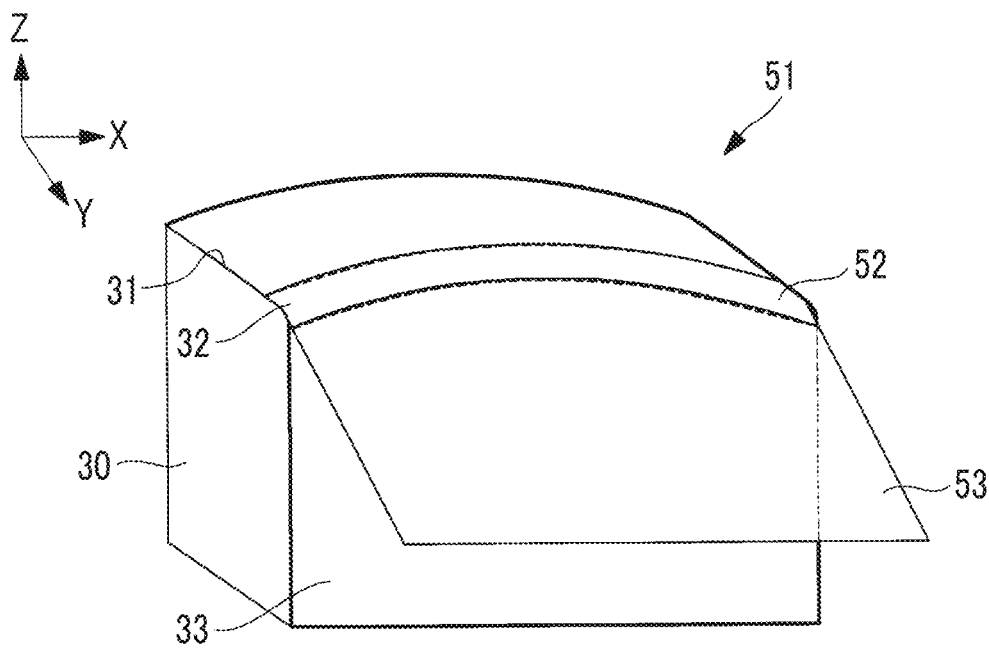
FIG. 32 is a perspective view illustrating a forming tool and the laminate according to the comparative example of the first embodiment of the present disclosure.
Figure 33:
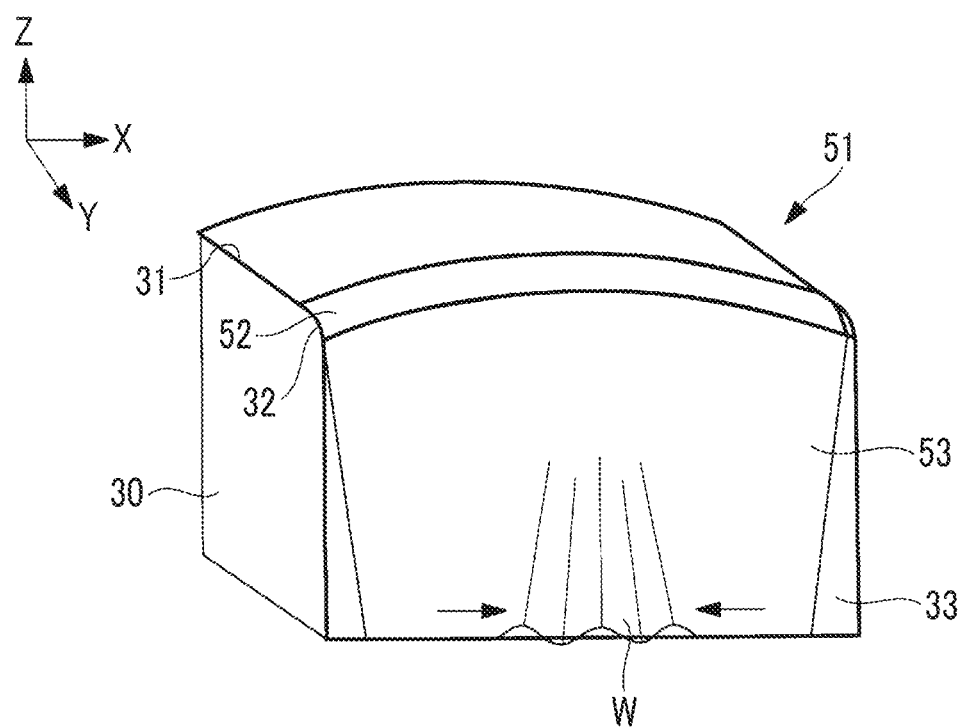
FIG. 33 is a perspective view illustrating the forming tool and the laminate according to the comparative example of the first embodiment of the present disclosure.

Specifically, for example, as in a comparative example illustrated in FIG. 31, a laminate 51 includes a deformable portion 52 that is curved to protrude upward, and bending forming may be performed on the laminate 51 that a length of the deformable portion 52 in the Y-axis direction is constant over the entire region in the X-axis direction (refer to FIGS. 32 and 33). In such a case, as indicated by arrows in FIG. 33, a compressive force along the X-axis direction (force from end portions toward a central portion in the X-axis direction) acts on a first adjacent portion 53 of the laminate 51. In addition, in the comparative example illustrated in FIG. 31, since the length of the deformable portion 52 in the Y-axis direction is constant over the entire region in the X-axis direction, a deformation amount of the deformable portion 52 when subjected to bending forming is substantially constant over the entire region in the X-axis direction. Therefore, a force to cancel the compressive force does not act. Therefore, the laminate 51 becomes a fiber excess state, and wrinkles W are generated in the laminate 51. Incidentally, an A-A cross section of FIG. 31 is illustrated by an alternate long and short dash line in FIG. 2. In addition, a B-B cross section of FIG. 31 is illustrated by an alternate long and short dash line in FIG. 3.

Also in the present embodiment, as illustrated in FIG. 1, the deformable portion 21 is curved so that the shape of the cross section in the Y-axis direction protrudes upward. Accordingly, during bending forming, a compressive force along the X-axis direction acts on the second adjacent portion 23 of the laminate 20 adjacent to the deformable portion 21 in the Y-axis direction. Namely, a force to cause a fiber excess state acts.

On the other hand, in the present embodiment, as illustrated in FIG. 1, in the deformable portion 21, the length in the Y-axis direction at the end portions in the X-axis direction and the length in the Y-axis direction at the central portion in the X-axis direction are different from each other. The deformation amount of the deformable portion 21 during bending forming changes depending on the length in the Y-axis direction. For this reason, in the present embodiment, the deformation amount by which the deformable portion is deformed during bending forming differs between the end portions and the central portion in the X-axis direction. For this reason, during bending forming, for example, a force or the like to pull the laminate 20 from a portion in which the deformation amount is small toward a portion in which the deformation amount is large acts on the laminate 20. In the present embodiment, since the deformation amount differs between the end portions and the central portion in the X-axis direction, during bending forming, a force along the X-axis direction (specifically, a force from the central portion toward the end portions in the X-axis direction as indicated by arrows A6 and A7 in FIG. 5) acts.

Specifically, in the deformable portion 21, as illustrated in FIGS. 2 and 3, the radius of curvature of the end portions in the X-axis direction is larger than the radius of curvature of the central portion in the X-axis direction. Accordingly, the deformable portion 21 has a shape in which the length (circumferential length) L1 in the Y-axis direction at the end portions in the X-axis direction is longer than the length (circumferential length) L2 in the Y-axis direction at the central portion in the X-axis direction. Incidentally, the alternate long and short dash lines of FIGS. 2 and 3 indicate lengths (circumferential lengths) of the deformable portion 52 at the same positions in the X-axis direction in the comparative example illustrated in FIG. 31. In addition, the deformable portion 52 of the comparative example has a shape corresponding to the deformable portion (portion that is the connecting portion 42 in the present embodiment) after bending forming. Namely, the deformable portion 52 of the comparative example has a shape in which the circumferential length does not change between before and after bending forming. Since the circumferential length of the deformable portion 52 after bending forming is substantially the same as a length of the curved portion 32 of the forming tool 30 in the Y-axis direction, the circumferential length of the deformable portion 52 is substantially the same as the length of the curved portion 32 in the Y-axis direction. Incidentally, the length of the curved portion 32 in the Y-axis direction means a length in the Y-axis direction along the shape of the curved portion 32.

As can be seen from FIGS. 2 and 3, the deformable portion 21 of the present embodiment is formed to shortcut a path from the first adjacent portion 22 to the second adjacent portion 23 as compared to the deformable portion 52 of the comparative example. Namely, the deformable portion 21 of the present embodiment has a circumferential length shorter than that of the deformable portion 52 of the comparative example. As described above, the circumferential length of the deformable portion 52 is substantially the same as the length of the curved portion 32 in the Y-axis direction. Consequently, the circumferential length of the deformable portion 21 is shorter than the length of the curved portion 32 in the Y-axis direction. Therefore, during bending forming, the laminate 20 (particularly, the first adjacent portion 22) is deformed to be pulled toward a deformable portion 21 side. Hereinafter, the difference between the circumferential length of the deformable portion 21 of the present embodiment and the circumferential length of the deformable portion 52 of the comparative example is referred to as a circumferential length difference.

In addition, as described above, the deformable portion 21 has a shape in which the length (circumferential length) L1 in the Y-axis direction at the end portions in the X-axis direction is longer than the length (circumferential length) L2 in the Y-axis direction at the central portion in the X-axis direction. Namely, the end portions of the deformable portion 21 have a shortcut section longer than that of the central portion of the deformable portion 21. The shortcut section is a section in which the shape of the deformable portion 21 is closer to a straight line than that of the deformable portion 52 of the comparative example. In other words, the shortcut section is a section in which the deformable portion 21 has a radius of curvature larger than that of the deformable portion 52 of the comparative example. Consequently, the end portions of the deformable portion 21 have a circumferential length difference larger than that of the central portion of the deformable portion 21. Accordingly, the deformation amount of the laminate 20 at the end portions due to the laminate 20 being pulled toward the deformable portion 21 side is larger than that at the central portion, and the deformation amount at the central portion is smaller than that at the end portions (refer to arrows A1 to A5 in FIG. 5). For this reason, during bending forming, as indicated by the arrows A6 and A7 in FIG. 5, a force to pull the laminate 20 from a central portion side on which the deformation amount is small toward a both end portions side on which the deformation amount is large (force from the central portion toward the end portions in the X-axis direction) acts on the laminate 20.

In such a manner, in the present embodiment, since the force from the end portions toward the central portion in the X-axis direction and the force from the central portion toward the end portions in the X-axis direction cancel each other, the force along the X-axis direction (force from the end portions toward the central portion in the X-axis direction) is suppressed. Accordingly, the laminate 20 is unlikely to become a fiber excess state. Therefore, it is possible to suppress the generation of wrinkles in the laminate 20.

In addition, in the present embodiment, the shape of the deformable portion 21 is curved. In detail, the cross section in the X-axis direction at the deformable portion 21 is curved. Accordingly, during bending forming, the deformable portion 21 is easily bent as compared to a case where the deformable portion has a planar shape. Therefore, bending forming can be more suitably performed on the deformable portion 21.

In addition, as a method for fabricating the laminate 20 by laminating fiber sheets, a method for laminating fiber sheets each having approximately the same area as an area of the lamination surface 11 of the lamination tool 10 can also be conceived. However, since the fiber sheet is difficult to elongate, in such a method, it may not be able to laminate the fiber sheets in a shape corresponding to the lamination surface 11 having a non-planar shape. On the other hand, in the present embodiment, the laminate 20 is fabricated using the fiber sheets each having a tape shape. Accordingly, the fiber sheets are easily placed to correspond to the lamination surface 11 having a non-planar shape. Therefore, the laminate 20 can be easily fabricated as compared to the case of laminating fiber sheets each having approximately the same area as the area of the lamination surface 11.

Incidentally, the method for fabricating the laminate 20 using the fiber sheets each having a tape shape is one example, and the present disclosure is not limited thereto. For example, when the laminate 20 can be suitably fabricated, the method for laminating fiber sheets each having approximately the same area as the area of the lamination surface 11 of the lamination tool 10 may be adopted.

In addition, a method for producing a composite structure by laminating fiber sheets in the final shape of the composite structure 40 can also be conceived. However, in order to laminate the fiber sheets each having a tape shape with a short width (length in the lateral direction), in a complicated shape (for example, a shape including a bent portion or a curved portion having a small radius of curvature) such as the final shape of the composite structure 40, the behavior of laminating the fiber sheets becomes complicated. For example, when such a complicated behavior is performed by machining, there is a possibility that the fiber sheets cannot be laminated because of the limitation of a machine or even when the fiber sheets can be laminated, laminating work takes a long time. On the other hand, in the present embodiment, since the laminate 20 that is an intermediate formed article has a relatively simple shape, the fiber sheets can be easily laminated. Therefore, the composite structure 40 can be produced in a relatively short time.

Modification Example 1

Figure 8:
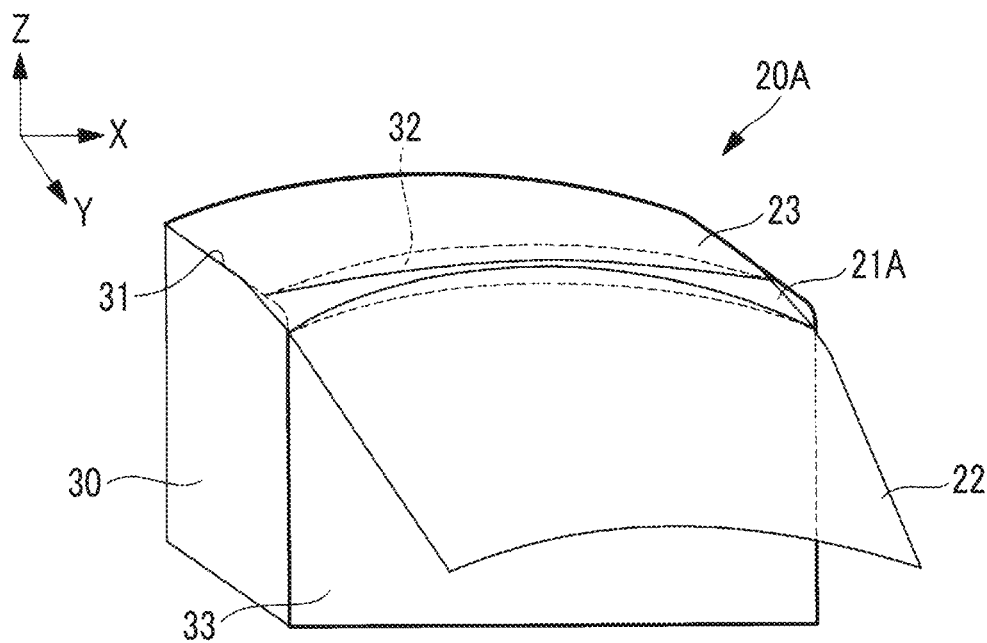
FIG. 8 is a perspective view illustrating a modification example of FIG. 4.

Next, a modification example (Modification Example 1) of the first embodiment will be described with reference to FIG. 8.

In the present modification example, the shape of a deformable portion of a laminate is mainly different from that of the first embodiment described above. Since other points are the same as those of the first embodiment, the same configurations are denoted by the same reference signs, and a detailed description thereof will be omitted.

In the first embodiment, an example has been described in which the radius of curvature of the central portion in the X-axis direction in the deformable portion 21 of the laminate 20 is substantially the same as the radius of curvature of the curved portion 32 of the forming tool 30 (refer to FIG. 4). As illustrated in FIG. 8, a radius of curvature of end portions in the X-axis direction in a deformable portion 21A of a laminate 20A of the present modification example is substantially the same as the radius of curvature of the curved portion 32 of the forming tool 30. In addition, a radius of curvature of a central portion in the X-axis direction in the deformable portion 21A of the laminate 20A is smaller than the radius of curvature of the curved portion 32 of the forming tool 30. Incidentally, the shape of the deformable portion according to the present modification example is not limited to the above-described shape of the deformable portion 21A. For example, in the deformable portion 21A, the radius of curvature of the end portion in the X-axis direction may be larger or smaller than the radius of curvature of the curved portion 32 of the forming tool 30.

Even in such a configuration, during bending forming, a force from the central portion toward the end portions in the X-axis direction acts on the laminate 20A. For this reason, similarly to the first embodiment, since the force from the end portions toward the central portion in the X-axis direction and the force from the central portion toward the end portions in the X-axis direction cancel each other, the force along the X-axis direction (force from the end portions toward the central portion in the X-axis direction) can be suppressed. Consequently, it is possible to suppress the generation of wrinkles.

Modification Example 2

Figure 9:
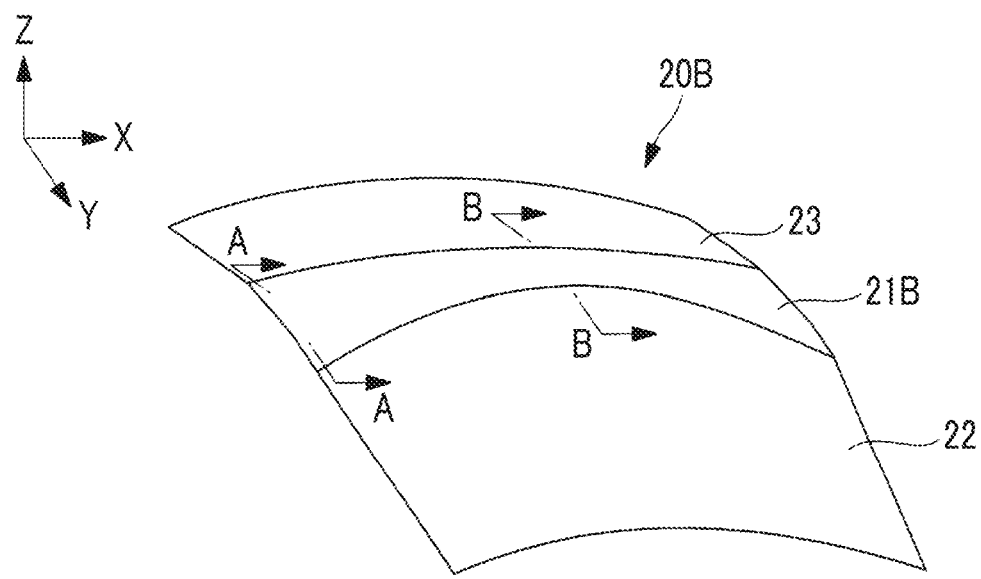
FIG. 9 is a perspective view illustrating a modification example of FIG. 1.
Figure 10:
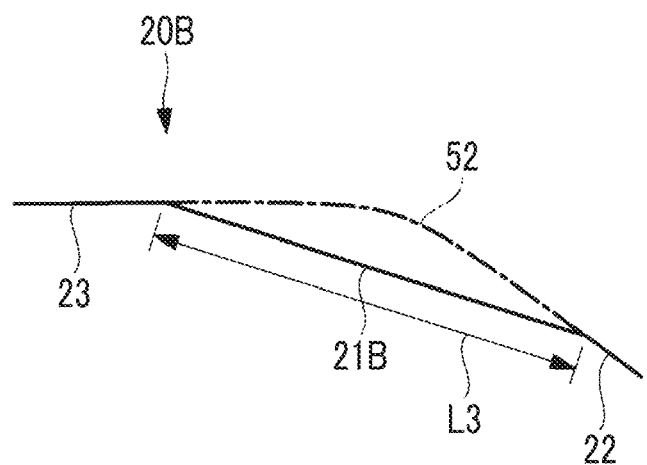
FIG. 10 is a cross-sectional view illustrating a cross section taken along line A-A of FIG. 9.
Figure 11:
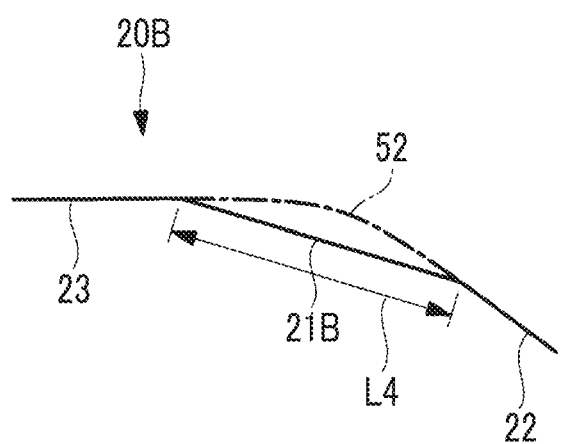
FIG. 11 is a cross-sectional view illustrating a cross section taken along line B-B of FIG. 9.

Next, a modification example (Modification Example 2) of the first embodiment will be described with reference to FIGS. 9 to 11.

In the present modification example, the shape of a deformable portion of a laminate is mainly different from that of the first embodiment described above. Since other points are the same as those of the first embodiment, the same configurations are denoted by the same reference signs, and a detailed description thereof will be omitted.

In the first embodiment, an example has been described in which the deformable portion 21 of the laminate 20 is formed such that both the cross section in the X-axis direction and the cross section in the Y-axis direction are curved (refer to FIG. 1). As illustrated in FIGS. 9 to 11, a deformable portion 21B of a laminate 20B of the present modification example is curved only in a cross section in the Y-axis direction. A cross section in the X-axis direction is linearly formed. As illustrated in FIGS. 10 and 11, even in such a configuration, in the deformable portion 21B, a length L3 in the Y-axis direction at both end portions in the X-axis direction can be set to be longer than a length L4 in the Y-axis direction at a central portion in the X-axis direction. Incidentally, similarly to the first embodiment (refer to FIGS. 2 and 3), alternate long and short dash lines of FIGS. 10 and 11 indicate lengths (circumferential lengths) of the deformable portion 52 at the same positions in the X-axis direction in the comparative example illustrated in FIG. 31. Consequently, as can be seen from FIGS. 10 and 11, also in the present modification example, the deformable portion 21B is formed to shortcut the path from the first adjacent portion 22 to the second adjacent portion 23 as compared to the deformable portion 52 of the comparative example. Namely, also in the present modification example, a length of the deformable portion 21B is shorter than the circumferential length of the deformable portion 52 of the comparative example. Therefore, also in the present modification example, the same effects as those of the first embodiment are exhibited.

Modification Example 3

Figure 12:
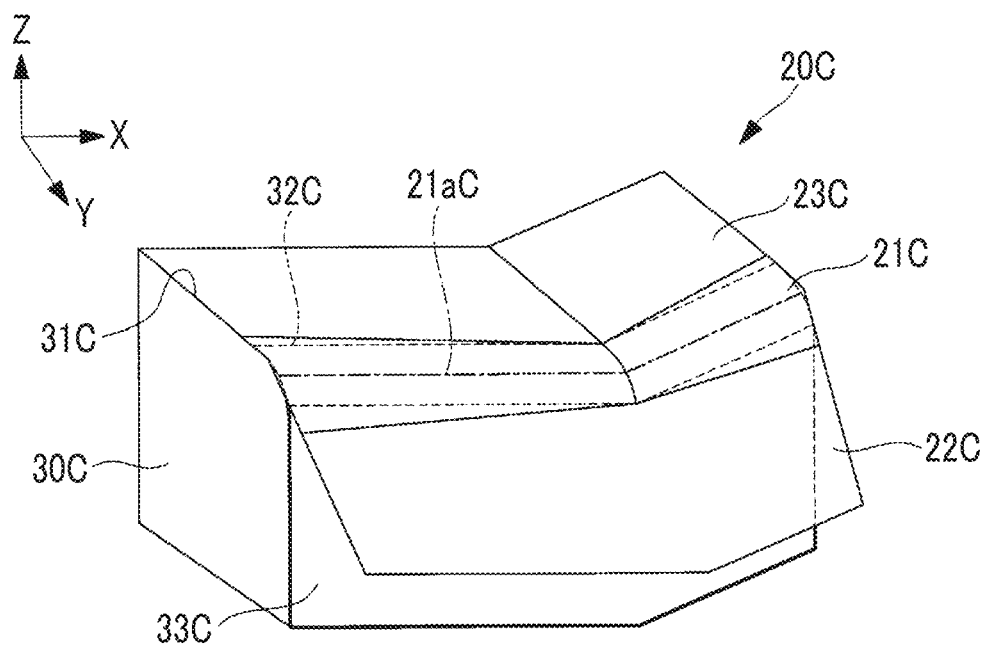
FIG. 12 is a perspective view illustrating a modification example of FIG. 4.

Next, a modification example (Modification Example 3) of the first embodiment will be described with reference to FIG. 12.

In the present modification example, the shape of the laminate 20 is mainly different from that of the first embodiment described above. Since other points are the same as those of the first embodiment, the same configurations are denoted by the same reference signs, and a detailed description thereof will be omitted.

In the first embodiment, an example has been described in which the deformation line 21a of the deformable portion 21 of the laminate 20 is curved (refer to FIG. 4).

A deformable portion 21C of the present modification example is the same as that of the first embodiment in that a cross section in the X-axis direction is curved. As illustrated in FIG. 12, in a plan view, the deformable portion 21C of the present modification example is bent so that an intermediate position in the X-axis direction protrudes in the Y-axis direction. In this regard, the present modification example is different from the first embodiment.

In addition, the length of the deformable portion 21C in the Y-axis direction decreases from a bent portion toward both end portions in the X-axis direction. In addition, the radius of curvature decreases from the bent portion toward both the end portions in the X-axis direction.

In addition, a deformation line 21aC included in the deformable portion 21C is also bent similarly to the deformable portion 21C. In other words, the deformation line 21aC has a kinked shape. In addition, in a laminate 20C of the present modification example, a first adjacent portion 22C and a second adjacent portion 23C are also similarly bent.

In addition, a forming tool 30C according to the present modification example has a shape corresponding to the shape of the laminate 20C. In detail, a placement portion 31C is bent to correspond to the shape of the second adjacent portion 23C. In addition, a curved portion 32C is bent to correspond to the shape of the deformable portion 21C. In addition, a vertical portion 33C is bent to correspond to the shape of the first adjacent portion 22C.

Even when the laminate 20C is fabricated in such a shape, during bending forming, a force from the central portion toward the end portions in the X-axis direction acts. For this reason, similarly to the first embodiment, since the force from the end portions toward the central portion in the X-axis direction and the force from the central portion toward the end portions in the X-axis direction cancel each other, the force along the X-axis direction (force from the end portions toward the central portion in the X-axis direction) can be suppressed. Consequently, it is possible to suppress the generation of wrinkles.

Modification Example 4

Next, a modification example (Modification Example 4) of the first embodiment will be described with reference to FIGS. 13 and 14.

In the present modification example, the shape of a deformable portion of a laminate is mainly different from that of the first embodiment described above. Since other points are the same as those of the first embodiment, the same configurations are denoted by the same reference signs, and a detailed description thereof will be omitted.

Figure 13:
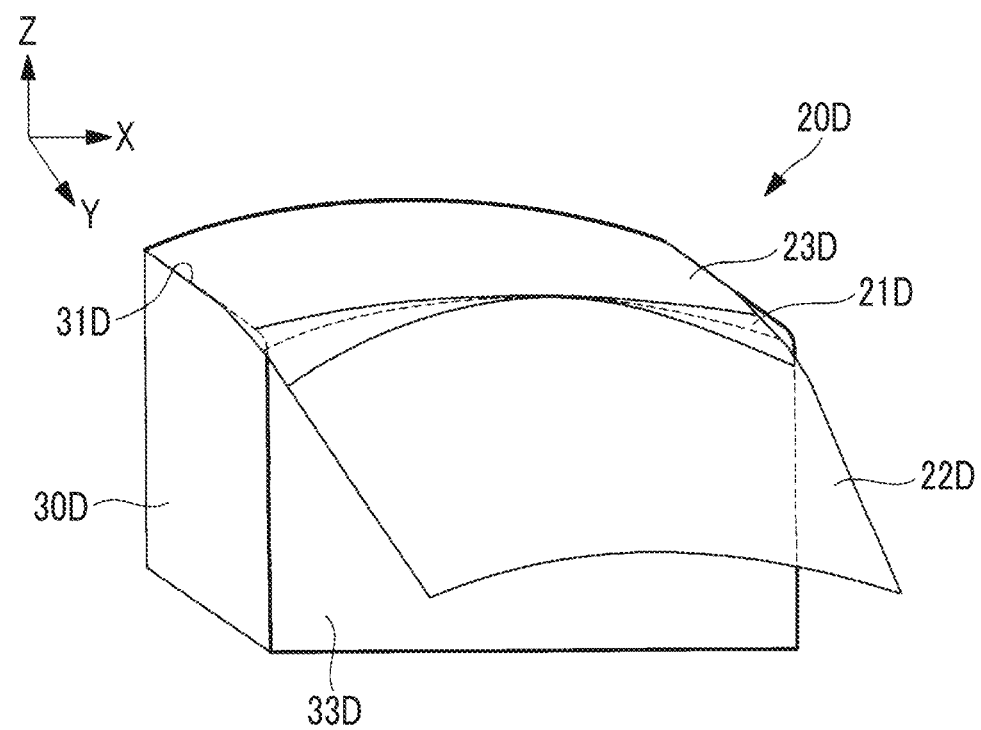
FIG. 13 is a perspective view illustrating a modification example of FIG. 4.

As illustrated in FIG. 13, a laminate 20D of the present modification example includes a deformable portion 21D, a first adjacent portion 22D, and a second adjacent portion 23D. The length of the deformable portion 21D in the Y-axis direction is zero at a central portion in the X-axis direction. Then, with the central portion as a base point, the length of the deformable portion 21D in the Y-axis direction increases toward both end portions in the X-axis direction. In addition, no curved portion exists in a forming tool 30D of the present modification example. In the forming tool 30D, a placement portion 31D and a vertical portion 33D are connected to each other without going through a curved portion.

Figure 14:
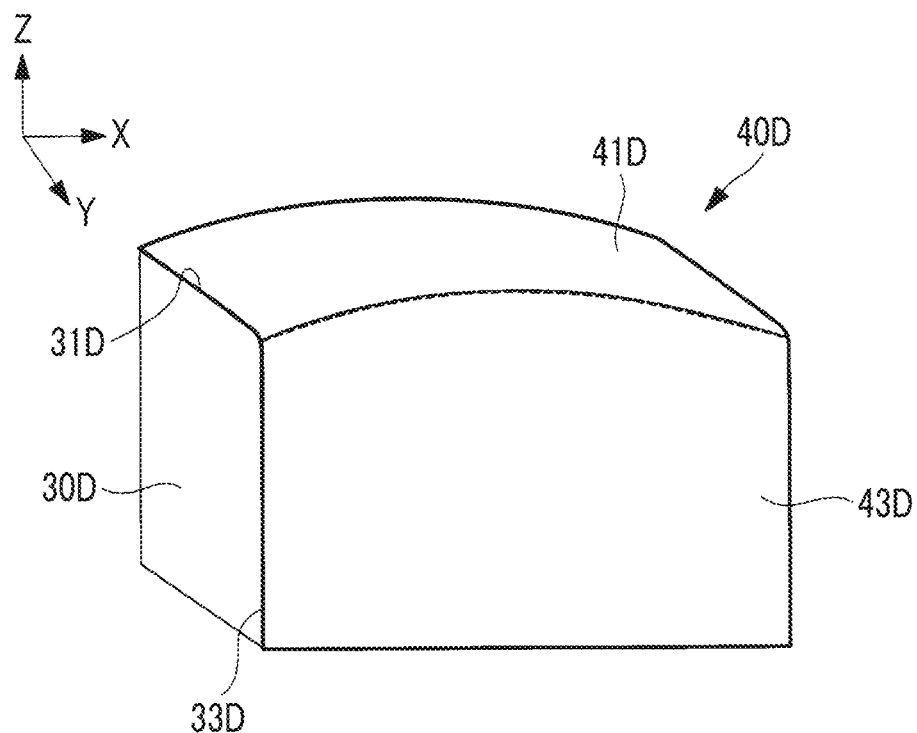
FIG. 14 is a perspective view illustrating a composite structure and a forming tool according to the modification example illustrated in FIG. 13.

When bending forming is performed on the laminate 20D using the forming tool 30D, as illustrated in FIG. 14, a composite structure 40D is formed in which no connecting portion exists and an upper surface portion 41D and a side surface portion 43D are directly connected to each other.

When the composite structure 40D is formed, similarly to the first embodiment, a force from the end portions toward the central portion in the X-axis direction and a force from the central portion toward the end portions in the X-axis direction cancel each other by means of the deformable portion 21D described in the present modification example, so that the force along the X-axis direction (force from the end portions toward the central portion in the X-axis direction) can be suppressed. Consequently, it is possible to suppress the generation of wrinkles.

Second Embodiment

Next, a second embodiment of the present disclosure will be described with reference to FIGS. 15 to 17. In the present embodiment, the shape of a laminate is different from that of the first embodiment. In addition, accordingly, the shape of a lamination tool and the shape of a forming tool are different. Since other points are the same as those of the first embodiment, the same configurations are denoted by the same reference signs, and a detailed description thereof will be omitted.

Figure 15:
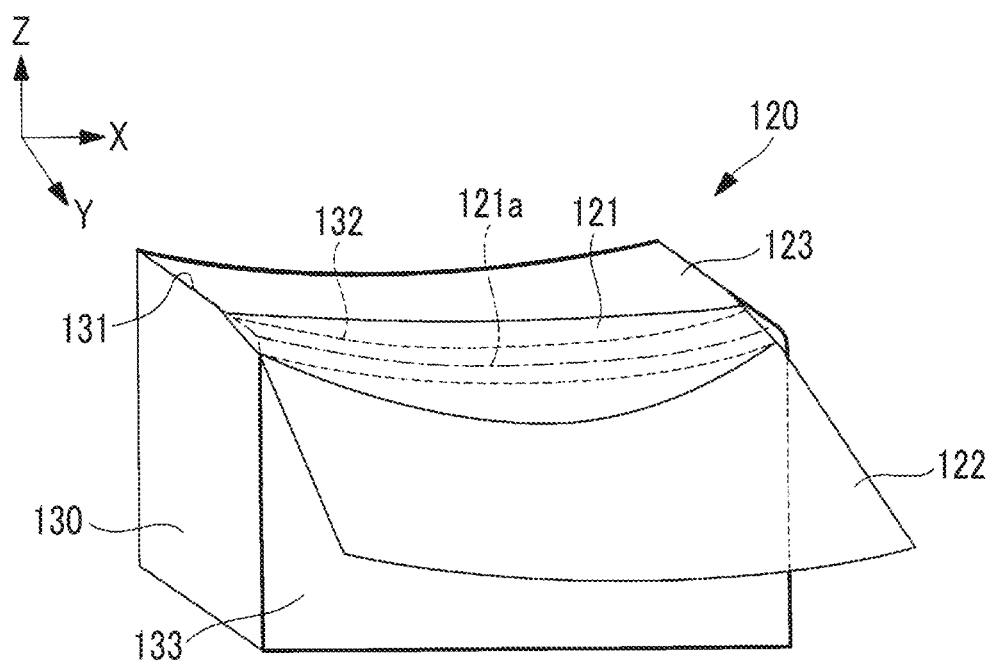
FIG. 15 is a perspective view illustrating a forming tool and a laminate according to a second embodiment of the present disclosure.

As illustrated in FIG. 15, a deformable portion 121 of a laminate 120 of the present embodiment is curved so that a cross section in the X-axis direction protrudes downward. The deformable portion 121 includes a deformation line 121a that is an imaginary line extending in the X-axis direction. The deformation line 121a is curved to protrude downward. In addition, the deformable portion 121 is curved so that a cross section in the Y-axis direction protrudes downward. In addition, the length of the deformable portion 121 in the Y-axis direction decreases from a central portion toward both end portions in the X-axis direction. In addition, the radius of curvature of the cross section in the X-axis direction decreases from the central portion toward both the end portions in the X-axis direction.

In addition, a first adjacent portion 122 and a second adjacent portion 123 of the present embodiment are curved so that a cross section in the Y-axis direction protrudes downward.

Figure 17:
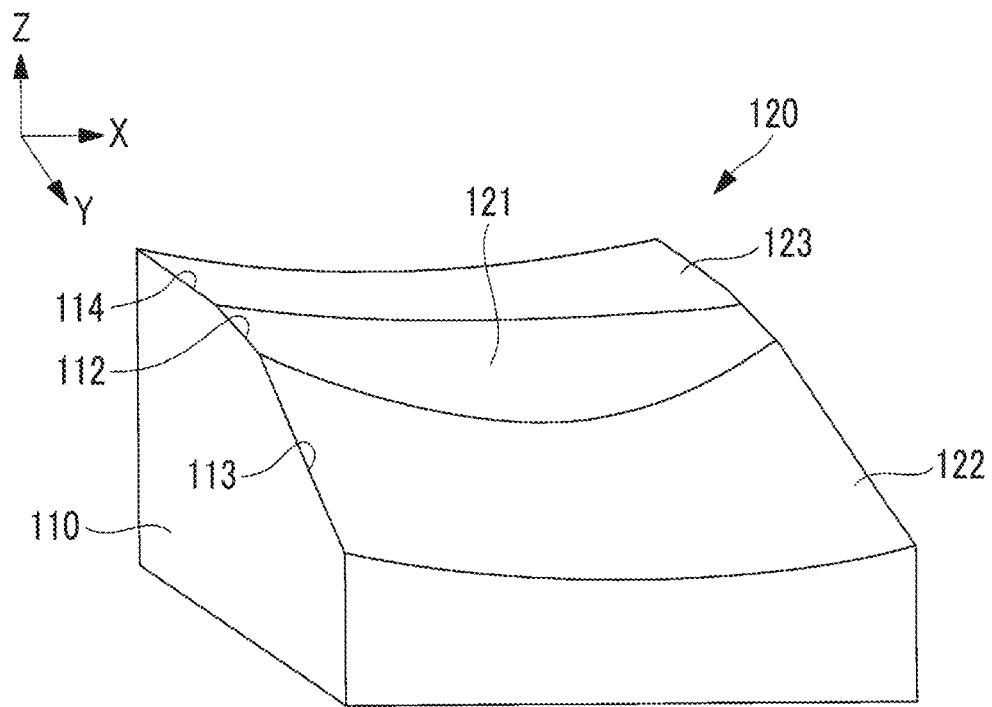
FIG. 17 is a perspective view illustrating a lamination tool and the laminate according to the second embodiment of the present disclosure.

In addition, as illustrated in FIG. 17, a first surface portion 112 of a lamination tool 110 of the present embodiment has a shape corresponding to the deformable portion 121 of the present embodiment. Namely, the first surface portion 112 is curved so that a cross section in the X-axis direction protrudes downward. In addition, the first surface portion 112 is curved so that a cross section in the Y-axis direction protrudes downward. In addition, the length of the first surface portion 112 in the Y-axis direction decreases from the central portion toward both the end portions in the X-axis direction. The radius of curvature of the cross section in the X-axis direction decreases from the central portion toward both the end portions in the X-axis direction.

In addition, a second surface portion 113 and a third surface portion 114 of the present embodiment are curved so that a cross section in the Y-axis direction protrudes downward.

In addition, as illustrated in FIG. 15, an upper surface of a curved portion 132 of a forming tool 130 of the present embodiment has an arc shape of 90 degrees in which a cross section in the X-axis direction protrudes downward over the entire region in the X-axis direction. In addition, an upper surface of a placement portion 131 of the forming tool 130 of the present embodiment is curved so that a cross section in the Y-axis direction protrudes downward. An upper end portion of a vertical portion 133 is curved to correspond to the shape of the curved portion 132. Incidentally, the shape of the cross section in the X-axis direction at the upper surface of the curved portion 132 may be an arc shape of an angle smaller than 90 degrees or an arc shape of an angle larger than 90 degrees.

Figure 16:
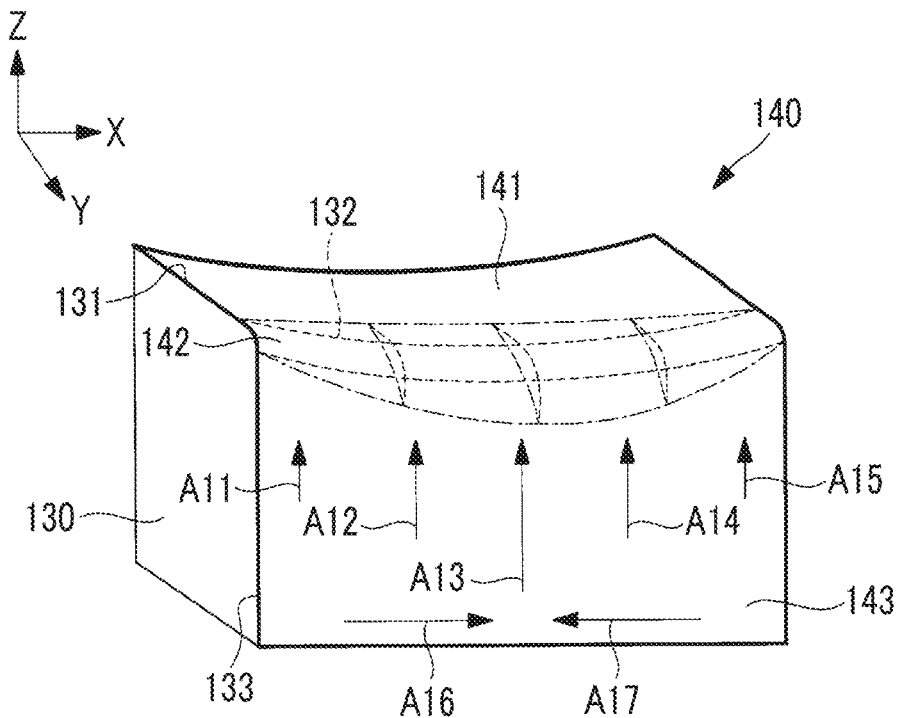
FIG. 16 is a perspective view illustrating a composite structure and the forming tool according to the second embodiment of the present disclosure.

As illustrated in FIG. 16, a connecting portion 142 of a composite structure 140 of the present embodiment connects an upper surface portion 141 and a side surface portion 143. The connecting portion 142 has an arc shape of 90 degrees in which a cross section in the X-axis direction protrudes downward over the entire region in the X-axis direction. In addition, the upper surface portion 141 is curved so that a cross section in the Y-axis direction protrudes downward. Incidentally, the shape of the cross section in the X-axis direction at the connecting portion 142 may be an arc shape of an angle smaller than 90 degrees or an arc shape of an angle larger than 90 degrees. Incidentally, in FIG. 16, the deformable portion 121 of the laminate 120 is illustrated by alternate long and short dash lines.

Figure 34:
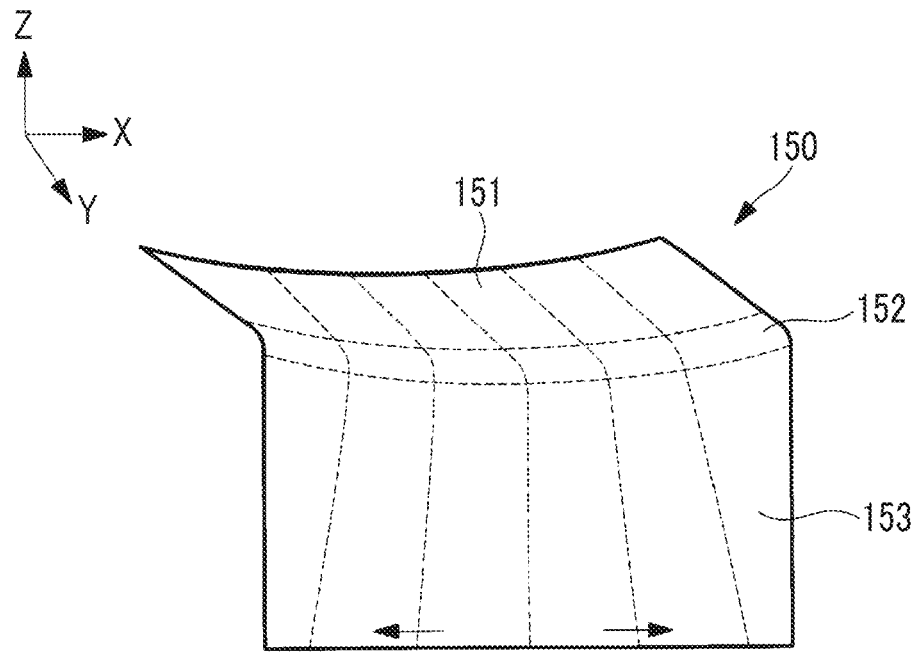
FIG. 34 is a perspective view illustrating a composite structure according to a comparative example of the second embodiment of the present disclosure.

In the present embodiment, as illustrated in FIG. 15, the deformable portion 121 is curved so that the shape of the cross section in the Y-axis direction protrudes downward. When a laminate having a shape in which the shape of a cross section in the Y-axis direction is curved to protrude downward is formed to be bent in the same direction as a protruding direction, to produce a composite structure 150 illustrated in a comparative example of FIG. 34, during bending forming, as indicated by arrows in FIG. 34, a tensile force along the X-axis direction (force from a central portion toward end portions in the X-axis direction) acts on a second adjacent portion (portion that becomes a side surface portion 153 after bending forming) adjacent to a deformable portion (portion that becomes a connecting portion 152 after bending forming) of a laminate in the Y-axis direction. Namely, a force to cause a fiber shortage state acts on the second adjacent portion. Incidentally, the composite structure 150 according to the comparative example illustrated in FIG. 34 is obtained by performing bending forming on the laminate in which the length of the deformable portion in the Y-axis direction is constant over the entire region in the X-axis direction.

On the other hand, in the present embodiment, as illustrated in FIG. 15, the deformable portion 121 has a shape in which a length (circumferential length) in the Y-axis direction at the end portions in the X-axis direction is shorter than a length (circumferential length) in the Y-axis direction at the central portion in the X-axis direction. Namely, a shortcut section of the central portion is longer than that of the end portions.

Incidentally, the shortcut section is a section in which the shape of the deformable portion 121 is closer to a straight line than that of the deformable portion of the comparative example. In other words, the shortcut section is a section in which the deformable portion 121 has a radius of curvature larger than that of the deformable portion of the comparative example. Consequently, the central portion has a circumferential length difference larger than that of the end portions. Accordingly, the deformation amount of the laminate 120 at the central portion due to the laminate 120 being pulled toward a deformable portion 121 side is larger than that at the end portions, and the deformation amount at the end portions is smaller than that at the central portion (refer to arrows A11 to A15 in FIG. 16). For this reason, during bending forming, as indicated by the arrows A16 and A17 in FIG. 16, a force to pull the laminate 120 from the end portions in which the deformation amount is small toward the central portion in which the deformation amount is large (force from the end portions toward the central portion in the X-axis direction) acts on the laminate 120.

In such a manner, in the present embodiment, since the force from the end portions toward the central portion in the X-axis direction and the force from the central portion toward the end portions in the X-axis direction cancel each other, the force along the X-axis direction (force from the central portion toward the end portions in the X-axis direction) is suppressed. Since the force acting on the laminate 120 along the X-axis direction is suppressed, a force acting on the fibers included in the laminate 120 along the X-axis direction is also suppressed. Accordingly, the laminate 120 is unlikely to become a fiber shortage state. Therefore, it is possible to suppress the generation of wrinkles in the laminate 120.

Third Embodiment

Next, a third embodiment of the present disclosure will be described with reference to FIGS. 20 to 27. In the present embodiment, a method for fabricating a laminate including a deformable portion is different from those of the first embodiment and the second embodiment. The same configurations as those of the first embodiment and the second embodiment are denoted by the same reference signs, and a detailed description thereof will be omitted.

Figure 20:
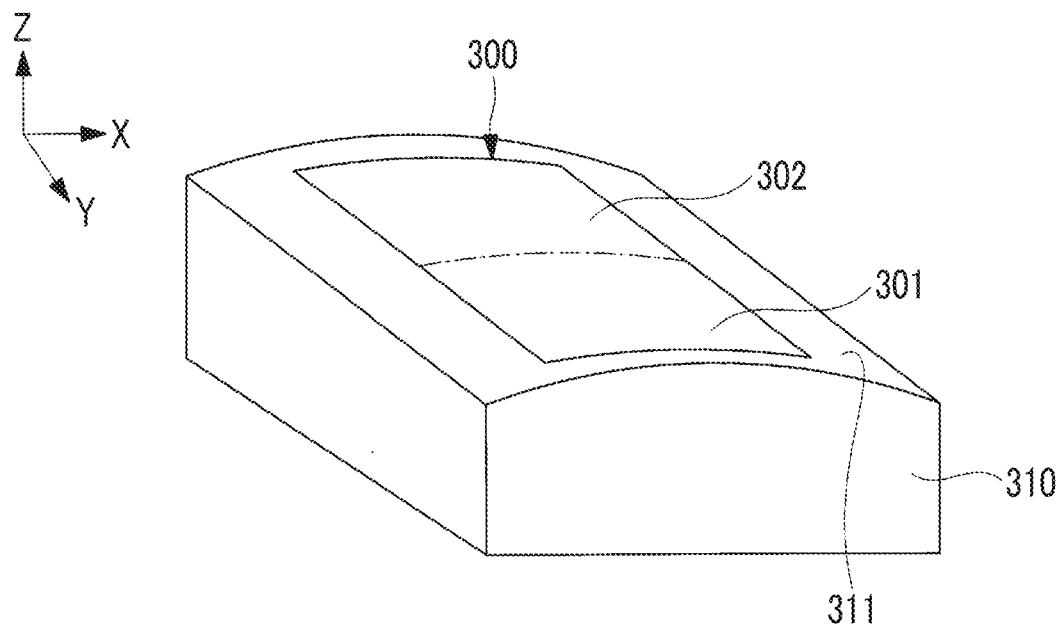
FIG. 20 is a perspective view illustrating a lamination tool and a laminate according to a third embodiment of the present disclosure.
Figure 21:
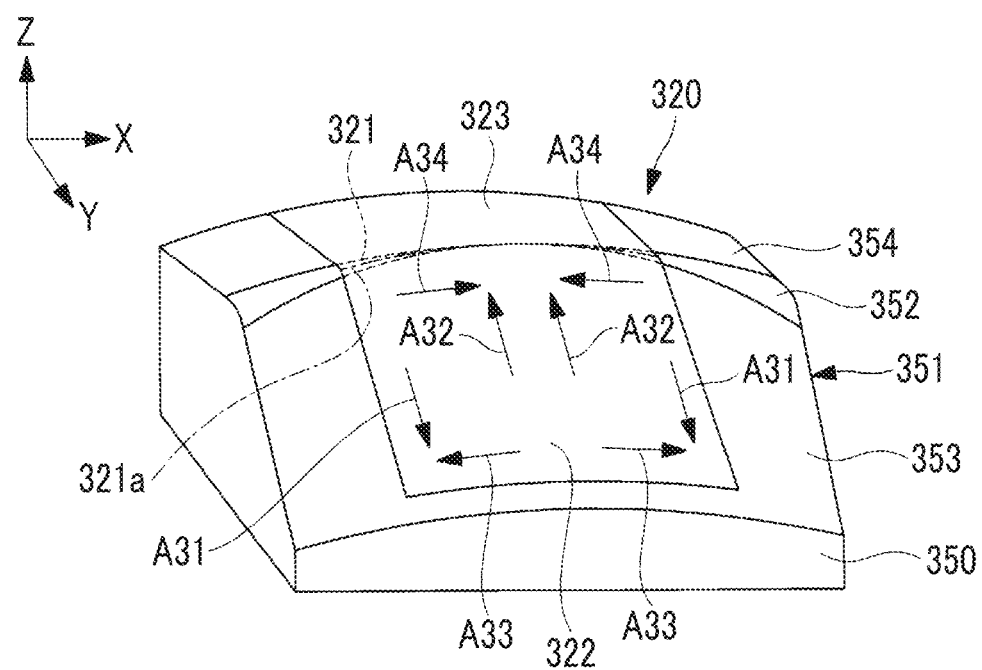
FIG. 21 is a perspective view illustrating a deforming tool and the laminate according to the third embodiment of the present disclosure.
Figure 22:
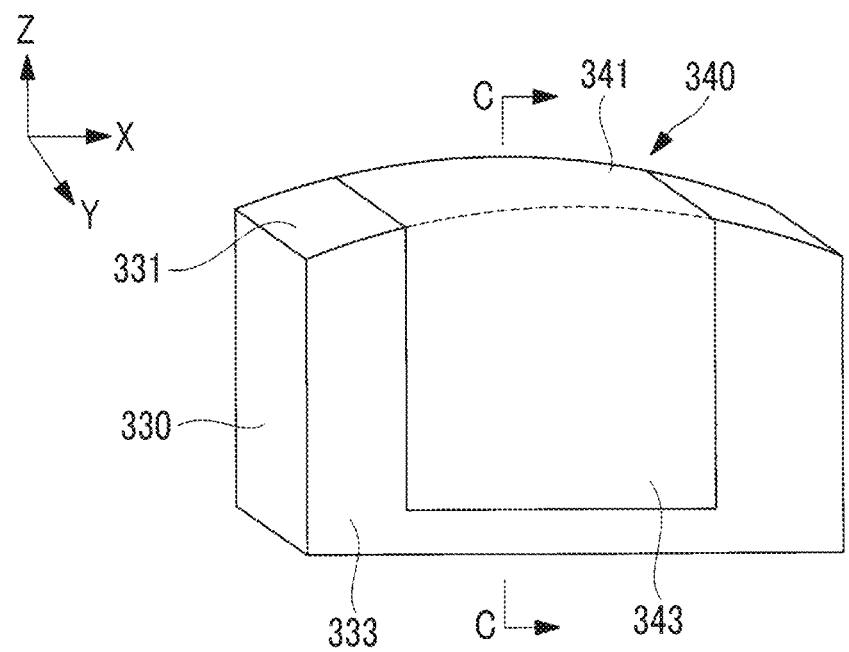
FIG. 22 is a perspective view illustrating a composite structure and a forming tool according to the third embodiment of the present disclosure.

In the first embodiment and the second embodiment, the laminate including the deformable portion is fabricated by laminating the fiber sheets, but in the present embodiment, first, as illustrated in FIG. 20, a laminate 300 not including a deformable portion 321 is fabricated by laminating fiber sheets (lamination step), and next, as illustrated in FIG. 21, a laminate 320 including the deformable portion 321 is fabricated by deforming the laminate 300 not including the deformable portion 321 (deformation step). Then, as illustrated in FIG. 22, the fabricated laminate 320 including the deformable portion 321 is processed into a composite structure 340 by being subjected to bending forming (forming step).

As illustrated in FIG. 20, the laminate 300 not including the deformable portion 321 is fabricated by laminating the fiber sheets on a lamination tool 310. In the lamination tool 310, a lamination surface 311 on which the fiber sheet is placed is curved so that the shape of a cross section in the Y-axis direction protrudes upward. In addition, the shape of a cross section in the X-axis direction at the lamination surface 311 is substantially linearly formed. Incidentally, the shape of the cross section in the X-axis direction at the lamination surface 311 may be gently curved.

The laminate 300 fabricated by the lamination tool 310 of the present embodiment has a shape corresponding to the lamination surface 311. Namely, the laminate 300 is curved so that the shape of the cross section in the Y-axis direction protrudes upward, and the shape of the cross section in the X-axis direction is linear. Incidentally, as described above, the laminate 300 at this stage does not include the deformable portion 321 described in the first embodiment or the like.

In addition, the laminate 300 includes a first region 301 that becomes a first adjacent portion 322 and a second region 302 that is a region other than the first region 301, when the laminate 300 is deformed using a deforming tool 350 to be described later. The first region 301 and the second region 302 are adjacent regions and are divided by an alternate long and short dash line in FIG. 20.

Next, as illustrated in FIG. 21, the laminate 300 not including the deformable portion 321 is placed on a placement surface 351 of the deforming tool 350. Then, the laminate 300 not including the deformable portion 321 is pressed against the deformable tool 350 to be deformed into a shape corresponding to the placement surface 351 of the deforming tool 350. Specifically, the laminate 300 is deformed into the laminate 320 including the deformable portion 321. Incidentally, as in the example illustrated in Modification Example 4 of the first embodiment (refer to FIG. 13), FIG. 21 illustrates an example where the deformable portion 321 is shaped such that a length in the Y-axis direction is zero at the central portion in the X-axis direction, but the shape of the deformable portion 321 of the present embodiment is not limited thereto. The deformable portion 321 may have any shape as long as the shape is the shape described in the first embodiment.

As illustrated in FIG. 21, the deforming tool 350 is a block-shaped member, and an upper surface of the deforming tool 350 is the placement surface 351. The placement surface 351 has a shape corresponding to the shape of the laminate to be fabricated (the laminate 320 including the deformable portion 321). In detail, the placement surface 351 has a first surface portion 352 corresponding to the deformable portion 321 of the laminate 320 to be described later; a second surface portion 353 that curves and extends diagonally downward from one end portion of the first surface portion 352 in the Y-axis direction; and a third surface portion 354 that curves and extends diagonally upward from the other end portion (end portion opposite to the one end portion) of the first surface portion 352 in the Y-axis direction. The first surface portion 352, the second surface portion 353, and the third surface portion 354 are continuously connected to each other without going through a step portion or the like.

When the laminate 320 is fabricated, the deformable portion 321 of the laminate 320 is placed on the first surface portion 352. Namely, the first surface portion 352 has a shape corresponding to the deformable portion 321 of the laminate 320. The first surface portion 352 is curved so that a cross section in the X-axis direction protrudes upward. In addition, the first surface portion 352 is curved so that a cross section in the Y-axis direction protrudes upward. In addition, the length of the first surface portion 352 in the Y-axis direction increases from the central portion toward both end portions in the X-axis direction. Namely, in the first surface portion 352, a length in the Y-axis direction at both the end portions in the X-axis direction is longer than a length in the Y-axis direction (length is zero in the present embodiment) at the central portion in the X-axis direction. In addition, in the first surface portion 352, the radius of curvature of the cross section in the X-axis direction increases from the central portion toward both the end portions in the X-axis direction. Namely, in the first surface portion 352, a radius of curvature of the cross section in the X-axis direction at both the end portions in the X-axis direction is larger than a radius of curvature of the cross section in the X-axis direction on a central portion side in the X-axis direction.

As described above, in the example of the present embodiment, the shape of the laminate 320 fabricated by the deforming tool 350 is the same as the shape of the laminate 20D (refer to FIG. 13) illustrated in Modification Example 4 of the first embodiment. Namely, as illustrated in FIG. 21, the laminate 320 includes the deformable portion 321, the first adjacent portion 322, and a second adjacent portion 323. The length of the deformable portion 321 in the Y-axis direction is zero at the central portion in the X-axis direction. Then, with the central portion as a base point, the length of the deformable portion 321 in the Y-axis direction increases toward both the end portions in the X-axis direction. The deformable portion 321 includes a deformation line 321a that is an imaginary line extending in the X-axis direction. The first adjacent portion 322 curves and extends diagonally downward from one end portion of the deformable portion 321 in the Y-axis direction. The second adjacent portion 323 curves and extends diagonally upward from the other end portion of the deformable portion 321 in the Y-axis direction.

In addition, in the laminate 320 according to the present embodiment, an angle formed by the first adjacent portion 322 and the second adjacent portion 323 is approximately 160 degrees. Namely, in the deformation step, the second adjacent portion 323 moves relative to the first adjacent portion 322 so as to rotate approximately 20 degrees about a connecting portion between the second adjacent portion 323 and the deformable portion 321.

As illustrated in FIG. 22, the fabricated laminate 320 is processed into the composite structure 340 by performing bending forming on the laminate 320 using a forming tool 330. The forming tool 330 of the present embodiment has substantially the same shape as that of the forming tool 30D (refer to FIG. 14) illustrated in Modification Example 4 of the first embodiment. Namely, in the forming tool 330 of the present embodiment, no curved portion exists, and a placement portion 331 and a vertical portion 333 are connected to each other without going through a curved portion.

When bending forming is performed on the laminate 320 using the forming tool 330, as illustrated in FIG. 22, the composite structure 340 is formed in which no connecting portion exists and an upper surface portion 341 and a side surface portion 343 are directly connected to each other. A cross section in the X-axis direction at the upper surface portion 341 protrudes upward.

Next, a method for producing the composite structure 340 in the present embodiment will be described in detail.

First, as illustrated in FIG. 20, the laminate 300 is fabricated by laminating a plurality of fiber sheets on the lamination tool 310 (lamination step). At this time, the deformable portion 321 is not formed in the fabricated laminate 300.

Next, the laminate 300 not including the deformable portion 321 which is fabricated in the lamination step is placed on the deforming tool 350 (refer to FIG. 21). At this time, the laminate 300 is placed on the third surface portion 354 of the deforming tool 350. Namely, in a state where the laminate 300 is placed, the laminate 300 and the second surface portion 353 of the deforming tool 350 are not in contact with each other. Next, in a state where the laminate 300 is placed on the third surface portion 354 of the deforming tool 350, the laminate 300 is pressed such that the laminate 300 abuts on the first surface portion 352 and on the second surface portion 353. Accordingly, as illustrated in FIG. 21, the laminate 300 has a shape corresponding to the placement surface 351 of the deforming tool 350. Namely, the laminate 300 is deformed to include the deformable portion 321, the first adjacent portion 322, and the second adjacent portion 323 (deformation step). In the present embodiment, in the deformation step, the laminate 300 is deformed such that an angle formed by the first adjacent portion 322 and the second adjacent portion 323 is approximately 160 degrees. Namely, in the deformation step, the second adjacent portion 323 moves relative to the first adjacent portion 322 so as to rotate approximately 20 degrees about the connecting portion between the second adjacent portion 323 and the deformable portion 321, which serves as a central axis. Hereinafter, the angle by which the second adjacent portion 323 moves relative to the first adjacent portion 322 is referred to as a deformation angle. The deformation angle in the deformation step (as one example, approximately 20 degrees in the present embodiment) is set to be smaller than a deformation angle in the forming step to be described later (as one example, approximately 70 degrees in the present embodiment).

Incidentally, in the present embodiment, an example has been described in which the deformation angle in the deformation step is 20 degrees, but the present disclosure is not limited thereto. For example, the deformation angle in the deformation step is 10 degrees to 30 degrees. When the deformation angle is smaller than 10 degrees, there is possibility that in-plane deformation cannot be suitably performed. In addition, when the deformation angle is larger than 30 degrees, there is a possibility that it is difficult to separate in-plane deformation and interlayer slippage. Therefore, it is preferable that the deformation angle in the deformation step is 10 degrees to 30 degrees.

Next, the laminate 320 including the deformable portion 321 is placed on the forming tool 330. At this time, the second adjacent portion 323 of the laminate 320 is placed on the placement portion 331 of the forming tool 330. Next, the laminate 320 is pressed such that the entire regions of the deformable portion 321 and the first adjacent portion 322 of the laminate 320 abut on the forming tool 330. Accordingly, the laminate 320 is bent along the deformation line 321a. In such a manner, bending forming is performed along the deformation line 321a included in the deformable portion 321, to deform the deformable portion 321 (forming step).

At this time, the deformable portion 321 is formed to be bent in a direction opposite to a direction in which a cross section in the Y-axis direction at the deformable portion 321 protrudes. In such a manner, the composite structure 340 is produced.

In the present embodiment, in the forming step, the laminate 320 is deformed such that the angle formed by the first adjacent portion 322 (the side surface portion 343 in the composite structure 340) and the second adjacent portion 323 (the upper surface portion 341 in the composite structure 340) is approximately 90 degrees. Namely, in the deformation step, the second adjacent portion 323 moves relative to the first adjacent portion 322 so as to rotate approximately 70 degrees about the connecting portion between the second adjacent portion 323 and the deformable portion 321, which serves as a central axis. In accordance with the above, the deformation angle in the forming step is set to be larger than the deformation angle in the deformation step (as one example, approximately 20 degrees in the present embodiment).

Incidentally, in the present embodiment, an example has been described in which the angle formed by the side surface portion 343 and the upper surface portion 341 of the composite structure 340 is approximately 90 degrees, but the present disclosure is not limited thereto. The angle formed by the side surface portion 343 and the upper surface portion 341 of the composite structure 340 is not particularly limited, and the present disclosure can be suitably applied to a case where the angle is 80 degrees to 100 degrees.

In addition, in the present embodiment, an example has been described in which the deformation angle in the forming step is 70 degrees, but the present disclosure is not limited thereto. For example, the deformation angle in the forming step is 50 degrees to 90 degrees.

According to the present embodiment, the following effects are exhibited.

In the present embodiment, first, the laminate 300 is deformed to include the deformable portion 321, and then, bending forming is performed on the laminate 320 including the deformable portion 321. In addition, the length of the deformable portion 321 in an intersecting direction (the Y-axis direction) changes along one direction (the X-axis direction). Accordingly, in the forming step, the laminate 320 is unlikely to become a fiber excess state or a fiber shortage state. Therefore, similarly to the first embodiment, it is possible to suppress the generation of wrinkles in the laminate 320 in the forming step.

Consequently, it is possible to suppress a reduction in the strength of the composite structure 340.

In addition, in the present embodiment, the laminate 320 including the deformable portion 321 is fabricated by laminating the fiber sheets in the lamination step, and then by forming the deformable portion 321 through deforming the laminate 300. Namely, it is not necessary to form the deformable portion 321 in the laminate 300 in the lamination step. Accordingly, the shape of the laminate 300 to be fabricated in the lamination step can be simplified as compared to a case where a laminate including a deformable portion is fabricated in the lamination step. Therefore, the work in the lamination step can be simplified. Consequently, the cost incurred in the lamination step can be reduced. In addition, the lamination step can be shortened.

In addition, for example, when a laminate having a complicated shape such as including irregularities is fabricated, the laminate may have to be fabricated from fiber sheets each having a thin tape shape. On the other hand, for example, when a laminate having a simple shape such as a flat plate shape is fabricated, the laminate can be fabricated by laminating wide fiber sheets each having approximately the same area as a projected area of the laminate. In such a manner, in the present embodiment, since the shape of the laminate to be fabricated in the lamination step can be simplified, it is possible to improve the degree of freedom in the shape of the fiber sheets forming the laminate.

In addition, when the laminate is processed into a composite structure (namely, when the laminate is formed to be bent at approximately 90 degrees), a shape change in an in-plane direction of the laminate and deformation in which the laminated fiber sheets slip against each other occur in the laminate.

The shape change in the in-plane direction (hereinafter, referred to as "in-plane deformation") is a shape change occurring in the laminate along the in-plane direction (the X-axis direction and the Y-axis direction) as indicated by arrows in FIG. 21. In detail, as indicated by an arrow A31 in FIG. 21, a portion of the laminate which is not placed on the tool (in FIG. 21, the first adjacent portion 322) is deformed such that both end portions in the X-axis direction move from the other end portion side toward one end portion side in the Y-axis direction. In addition, as indicated by an arrow A32 in FIG. 21, a central portion in the X-axis direction is deformed to move from the one end portion side toward the other end portion side in the Y-axis direction. In addition, as indicated by an arrow A33 in FIG. 21, one end portion in the Y-axis direction is deformed to move from the central portion toward both the end portions, and as indicated by an arrow A34 in FIG. 21, the other end portion in the Y-axis direction is deformed to move from a both end portions side toward the central portion. Such deformation causes the fibers to be compressed.

Figure 23:
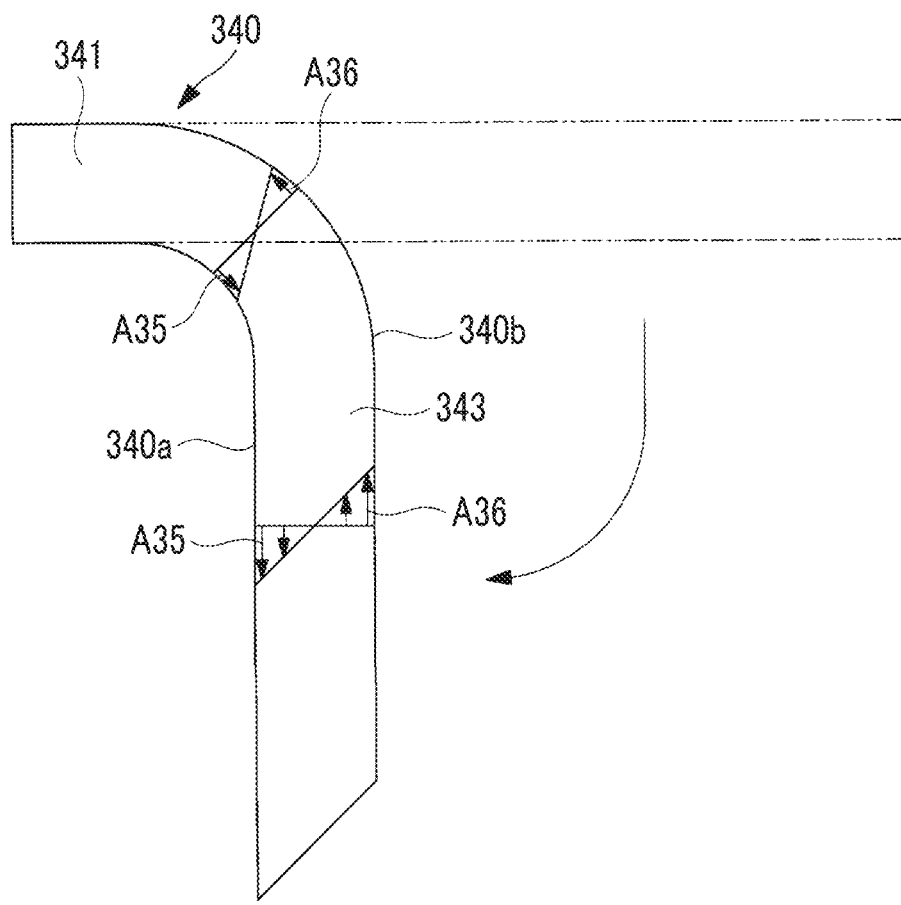
FIG. 23 is a cross-sectional view illustrating a cross section of the laminate of FIG. 22 taken along line C-C.

In addition, as illustrated in FIG. 23, the deformation in which the laminated fiber sheets slip against each other (hereinafter, referred to as "interlayer slippage") is deformation that occurs because of a difference in length between curved portions of a fiber sheet 340a located on an inner side and of a fiber sheet 340b located on an outer side among the fiber sheets forming the laminate. In detail, as indicated by an arrow A35 in FIG. 23, the inner side of the laminate is deformed to move toward a tip portion side in a bending direction. In addition, as indicated by an arrow A36 in FIG. 23, the outer side of the laminate is deformed to move to a base end portion side (side opposite to a tip portion) in the bending direction. Incidentally, in FIG. 23, for purpose of illustration, the curvature of a connecting portion between the upper surface portion 341 and the side surface portion 343 is illustrated in an emphasized manner.

In such a manner, when the laminate is processed into a composite structure, the in-plane deformation and the interlayer slippage occur. For this reason, when the step of deforming the laminate is performed in only one stage, the in-plane deformation and the interlayer slippage occur at the same time, so that the shape change of the laminate becomes complicated, and there is a possibility that the laminate is not appropriately deformed. When the laminate is not appropriately deformed, there is a possibility that wrinkles are generated in the laminate.

On the other hand, in the present embodiment, first, the laminate 300 is deformed to include the deformable portion 321, and then bending forming is performed on the laminate 320 including the deformable portion 321. Namely, the step of deforming the laminate 300 is divided into two stages (the deformation step and the forming step).

In the deformation step, as illustrated in FIG. 21, the laminate 300 is deformed such that the deformation angle is a relatively small angle of approximately 20 degrees. The deformation amount of the interlayer slippage increases as the deformation angle increases. Therefore, in the deformation step in which the deformation angle is small, almost no interlayer slippage occurs. On the other hand, in the present embodiment, since the laminate 320 is deformed to include the deformable portion 321 in the deformation step, most of the in-plane deformation is performed in the deformation step. From the above, in the deformation step, the in-plane deformation is mainly performed, and almost no interlayer slippage is performed.

In the forming step, as illustrated in FIG. 22 and the like, the laminate 320 is deformed such that the deformation angle is a relatively large angle of approximately 70 degrees. In the forming step in which the deformation angle is large, the deformation amount of the interlayer slippage is large. On the other hand, since the in-plane deformation has already been performed in the deformation step, almost no in-plane deformation is performed in the forming step. From the above, in the forming step, the interlayer slippage is mainly performed, and almost no in-plane deformation is performed.

In such a manner, in the present embodiment, the step of performing the in-plane deformation and the step of performing the interlayer slippage can be set as different steps. Therefore, since the shape change of the laminate is relatively simplified, the laminate can be appropriately deformed. Therefore, since the generation of wrinkles can be suppressed, it is possible to suppress a reduction in the strength of the composite structure 340.

In addition, in the present embodiment, the deformation angle in the deformation step (as one example, approximately 20 degrees in the present embodiment) is set to be smaller than the deformation angle in the forming step (as one example, approximately 70 degrees in the present embodiment). Accordingly, in the deformation step, the deformation amount of the interlayer slippage can be appropriately reduced. Therefore, the step of performing the in-plane deformation and the step of performing the interlayer slippage can be more reliably set as different steps.

Figure 24:
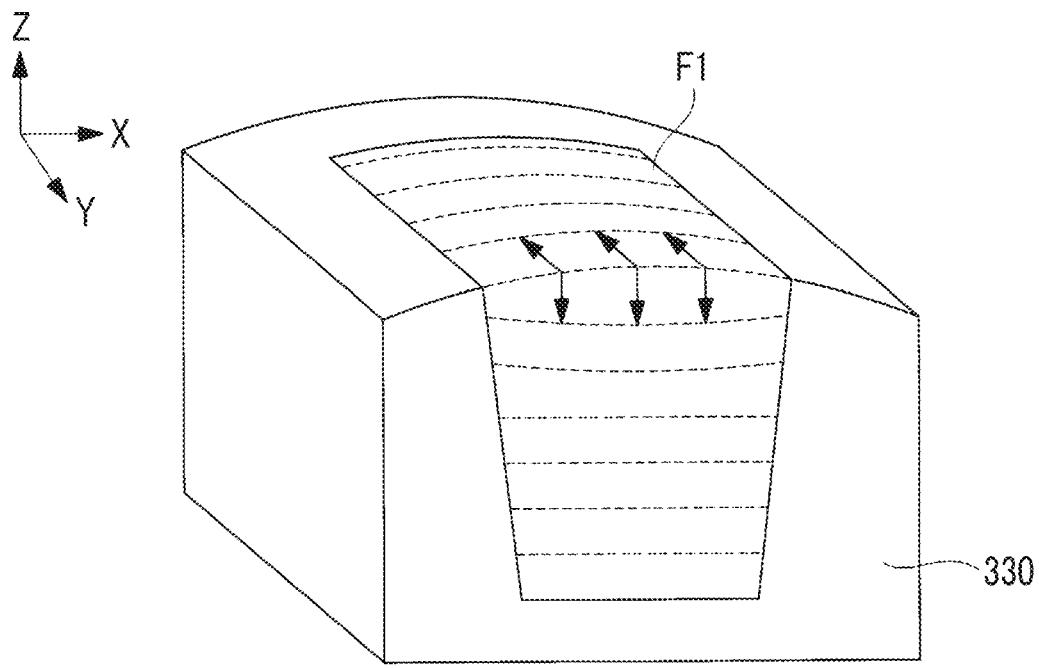
FIG. 24 is a schematic perspective view illustrating an elongation direction of a fiber sheet.
Figure 25:
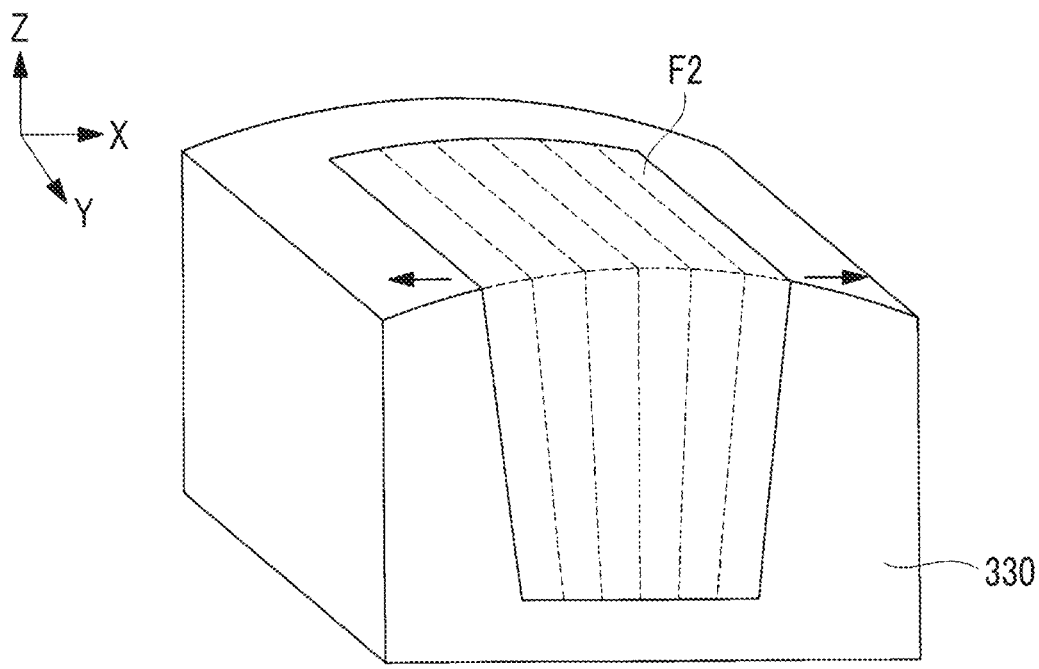
FIG. 25 is a schematic perspective view illustrating an elongation direction of a fiber sheet.

In addition, generally, in order to improve the strength of a laminate, the laminate in which a plurality of fiber sheets are laminated is formed by laminating the fiber sheets having different extending directions of fibers. The fiber sheet is easy to elongate in a direction orthogonal to the fibers and is difficult to elongate in the extending direction of the fibers. Therefore, when bending forming is performed on the laminate, as illustrated in FIGS. 24 and 25, the elongation direction differs for each fiber sheet. In FIGS. 24 and 25, the extending directions of the fiber are illustrated by broken lines. As illustrated in FIG. 24, a fiber sheet F1 in which the fibers extend along the X-axis direction is easy to elongate in the Y-axis direction orthogonal to the X-axis direction as indicated by arrows. Therefore, the elongation amount in the Y-axis direction is large. On the other hand, as illustrated in FIG. 25, a fiber sheet F2 in which the fibers extend along the Y-axis direction is easy to elongate in the X-axis direction orthogonal to the Y-axis direction as indicated by arrows. Therefore, the elongation amount in the X-axis direction is large. In such a manner, the elongation direction differs for each of the laminated fiber sheets, so that friction occurs between the fiber sheets (hereinafter, referred to as "interlayer"). The interlayer friction is a cause of the generation of wrinkles in the laminate.

Figure 26:
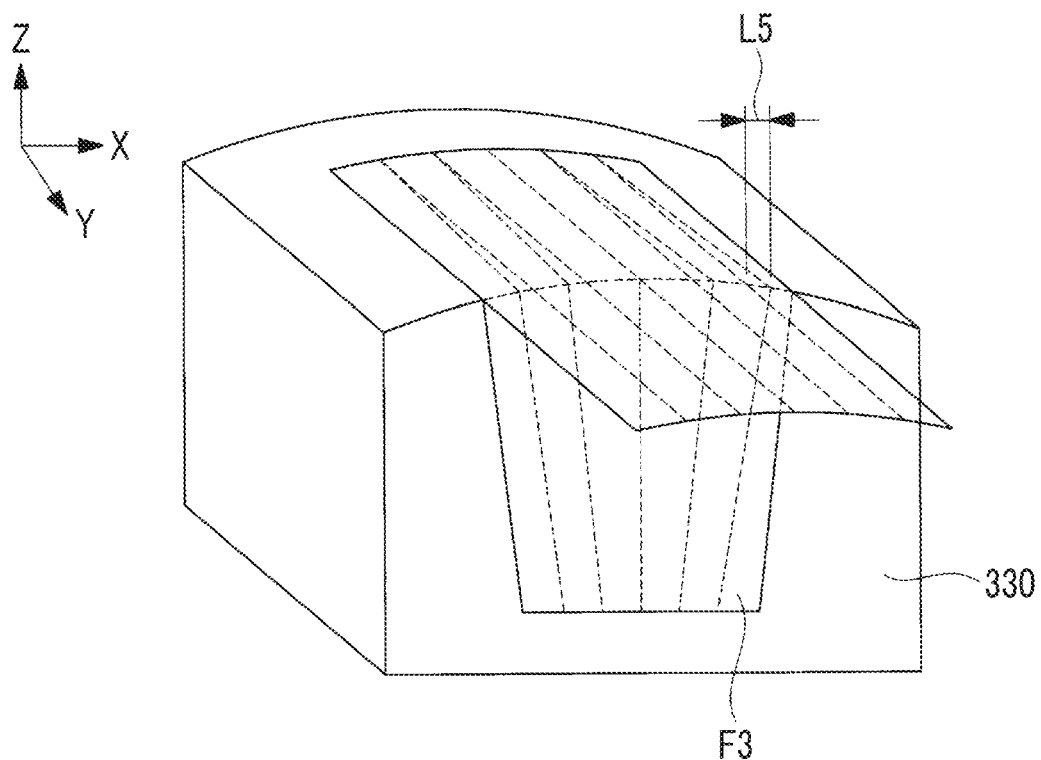
FIG. 26 is a schematic perspective view illustrating an elongation amount of a fiber sheet.
Figure 27:
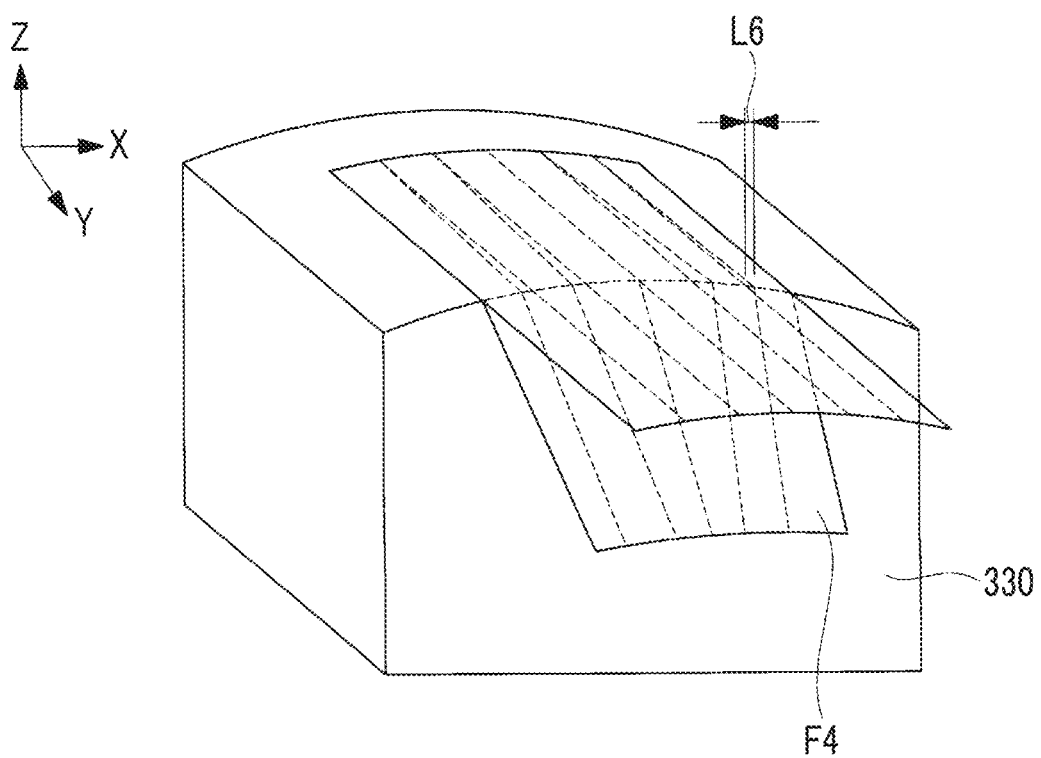
FIG. 27 is a schematic perspective view illustrating an elongation amount of a fiber sheet.

In the present embodiment, as described above, the step of deforming the laminate 300 is divided into two stages. Accordingly, the deformation amount of the laminates 300 and 320 in each step can be reduced. The elongation amount of the fiber sheet also changes according to the deformation amount of the laminate. Specifically, for example, as illustrated in FIG. 26, when bending forming is performed on the laminate such that the deformation angle is approximately 90 degrees, an elongation amount L5 of a fiber sheet F3 forming the laminate is relatively large. On the other hand, as illustrated in FIG. 27, when bending forming is performed on the laminate such that the deformation angle is approximately 20 degrees, an elongation amount L6 of a fiber sheet F4 is smaller than the elongation amount L5.

In such a manner, since the deformation amount of the laminates 300 and 320 in each step is reduced, the elongation amount of each fiber sheet in each step is also reduced. When each fiber sheet is elongated, even in the case of the same elongation amount, the interlayer friction is smaller when a small amount of elongation is performed a plurality of times than when a large amount of elongation is performed at once. Therefore, in the present embodiment, it is possible to suppress interlayer friction as compared to a case where the step of deforming the laminate is not divided. Consequently, since the generation of wrinkles in the laminate can be suppressed, it is possible to suppress a reduction in the strength of the composite structure 340.

Modification Example 5

In the lamination step, an interlayer adhesive force of the second region 302 (region that becomes a portion other than the first adjacent portion 322 when the laminate 300 is deformed using the deforming tool 350) of the laminate 300 illustrated in FIG. 20 may be adjusted to be stronger than an interlayer adhesive force of the first region 301 (region that becomes the first adjacent portion 322 when the laminate 300 is deformed using the deforming tool 350). Namely, the interlayer adhesive force is weakened in the first region 301, and the interlayer adhesive force is strengthened in the second region 302. The interlayer adhesive force refers to an adhesive force acting between the fiber sheets when the adjacent fiber sheets of the laminated fiber sheets are bonded to each other.

Since the first region 301 is a region that moves in the deformation step and in the forming step, interlayer slippage occurs with the movement in the first region 301. On the other hand, the second region 302 is a region that is mainly placed on the tools not to move in the deformation step and in the forming step. Consequently, the second region 302 is a region in which interlayer slippage does not occur.

Therefore, an interlayer adhesive force of the second region 302 is adjusted to be stronger than an interlayer adhesive force of the first region 301, so that in the deformation step and in the forming step, interlayer slippage is likely to appropriately occur in the first region 301, and bending formability is improved. As a result, it is possible to suppress the generation of wrinkles in the fiber sheet. In addition, in the second region 302 in which the interlayer adhesive force is relatively strong, it is possible to prevent the delamination of the fiber sheets occurring during lamination, and the laminability is improved. Further, in the second region 302 in which the interlayer adhesive force is relatively strong, it is possible to prevent interlayer delamination during handling, and the handleability is improved.

A method for adjusting the interlayer adhesive force is not particularly limited. For example, the interlayer adhesive force may be adjusted by adjusting a pressing force to press the laminate 300. In this case, in the first region 301, the pressing force is decreased to weaken the interlayer adhesive force, and in the second region 302, the pressing force is increased to strengthen the interlayer adhesive force.

In addition, the interlayer adhesive force may be adjusted by adjusting a heating temperature when the laminate 300 is heated. In this case, in the first region 301, the heating temperature is lowered to weaken the interlayer adhesive force, and in the second region 302, the heating temperature is raised to strengthen the interlayer adhesive force.

Fourth Embodiment

Next, a fourth embodiment of the present disclosure will be described with reference to FIGS. 28 to 30. In the present embodiment, the shape of the laminate is different from that of the third embodiment. In addition, accordingly, the shape of a lamination tool, the shape of a deforming tool, and the shape of a forming tool are different. Since other points are the same as those of the first embodiment, the same configurations are denoted by the same reference signs, and a detailed description thereof will be omitted.

Figure 28:
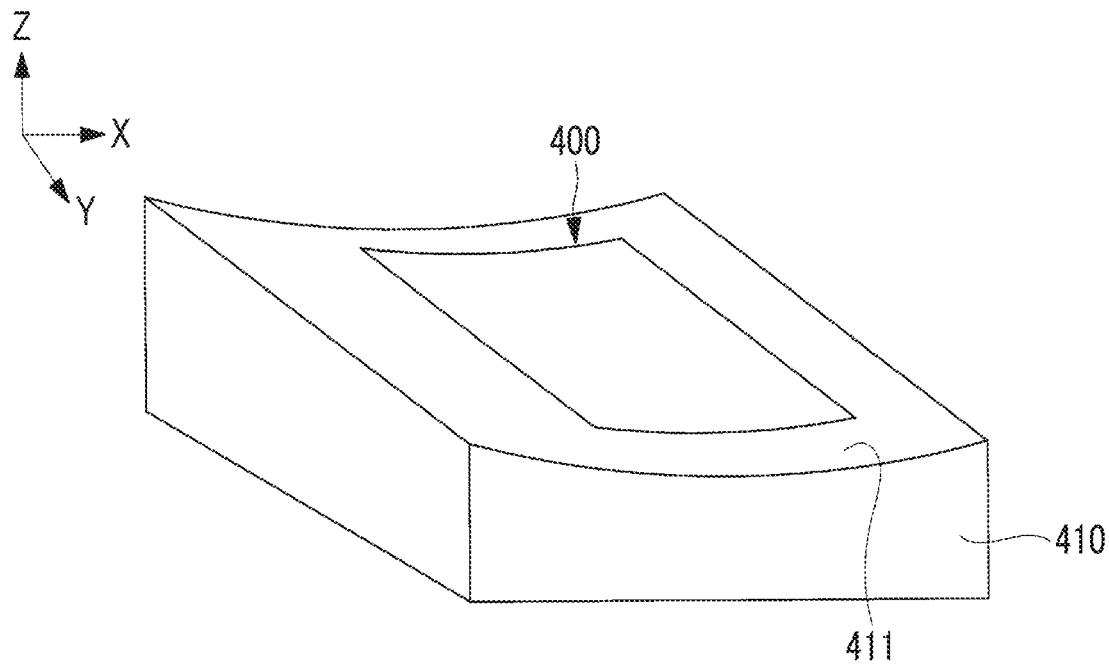
FIG. 28 is a perspective view illustrating a lamination tool and a laminate according to a fourth embodiment of the present disclosure.

As illustrated in FIG. 28, in a lamination tool 410 according to the present embodiment, a lamination surface 411 on which a fiber sheet is placed is curved so that the shape of a cross section in the Y-axis direction protrudes downward. In addition, the shape of a cross section in the X-axis direction at the lamination surface 411 is substantially linearly formed. Incidentally, the shape of the cross section in the X-axis direction at the lamination surface 411 may be gently curved.

A laminate 400 fabricated by the lamination tool 410 of the present embodiment has a shape corresponding to the lamination surface 411. Namely, the laminate 400 is curved so that the shape of a cross section in the Y-axis direction protrudes downward, and the shape of a cross section in the X-axis direction is linear. Incidentally, the laminate 400 at this stage does not have a deformable portion 421.

Figure 29:
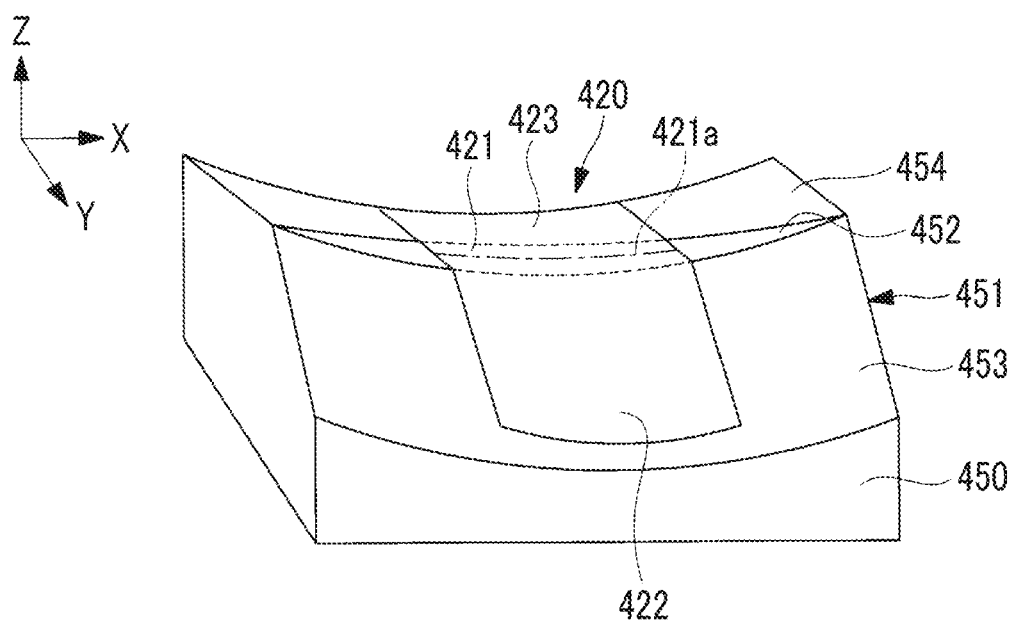
FIG. 29 is a perspective view illustrating a deforming tool and the laminate according to the fourth embodiment of the present disclosure.

Next, as illustrated in FIG. 29, the laminate 400 not including the deformable portion 421 is placed on a placement surface 451 of a deforming tool 450. Then, the laminate 400 not including the deformable portion 421 is pressed against the deforming tool 450 to be deformed into a shape corresponding to the placement surface 451 of the deforming tool 450. Specifically, the laminate 400 is deformed into a laminate 420 including the deformable portion 421. Incidentally, FIG. 29 illustrates an example where the deformable portion 421 is shaped such that a length in the Y-axis direction is zero at end portions in the X-axis direction, but the shape of the deformable portion of the present embodiment is not limited to the shape of the deformable portion 421 described above. For example, the deformable portion 421 may have the shape of the deformable portion 121 described in the second embodiment (refer to FIG. 17).

An upper surface of the deforming tool 450 is the placement surface 451. The placement surface 451 has a shape corresponding to the shape of the laminate to be fabricated (the laminate 420 including the deformable portion 421). In detail, the placement surface 451 has a first surface portion 452 corresponding to the deformable portion 421 of the laminate 420 to be described later; a second surface portion 453 that curves and extends diagonally downward from one end portion of the first surface portion 452 in the Y-axis direction; and a third surface portion 454 that curves and extends diagonally upward from the other end portion (end portion opposite to the one end portion) of the first surface portion 452 in the Y-axis direction. The first surface portion 452, the second surface portion 453, and the third surface portion 454 are continuously connected to each other without going through a step portion or the like.

The first surface portion 452 has a shape corresponding to the deformable portion 421 of the laminate 420. The first surface portion 452 is curved so that a cross section in the X-axis direction protrudes downward. In addition, the first surface portion 452 is curved so that a cross section in the Y-axis direction protrudes downward. In addition, the length of the first surface portion 452 in the Y-axis direction increases from the end portions toward the central portion in the X-axis direction. Namely, in the first surface portion 452, a length in the Y-axis direction at the central portion in the X-axis direction is longer than a length in the Y-axis direction (length is zero in the present embodiment) at the end portions in the X-axis direction.

As described above, in the example of the present embodiment, as illustrated in FIG. 29, the laminate 420 fabricated by the deforming tool 450 includes the deformable portion 421, a first adjacent portion 422, and a second adjacent portion 423. The length of the deformable portion 421 in the Y-axis direction is zero at both the end portions in the X-axis direction. Then, with both the end portions as a base point, the length of the deformable portion 421 in the Y-axis direction increases toward the central portion in the X-axis direction. The deformable portion 421 includes a deformation line 421a that is an imaginary line extending in the X-axis direction.

Figure 30:
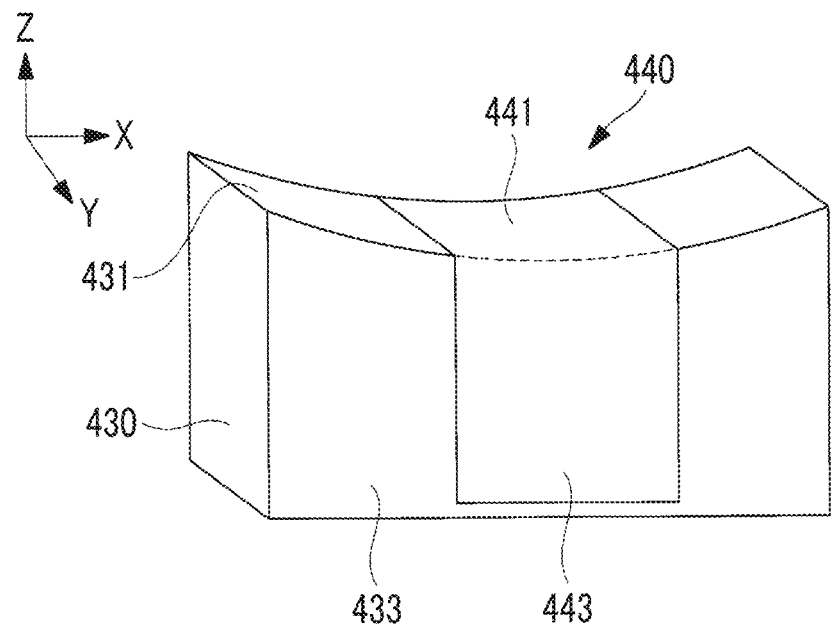
FIG. 30 is a perspective view illustrating a composite structure and a forming tool according to the fourth embodiment of the present disclosure.

As illustrated in FIG. 30, the fabricated laminate 420 is processed into a composite structure 440 by being subjected to bending forming using a forming tool 430. In the forming tool 430 of the present embodiment, no curved portion exists, and a placement portion 431 and a vertical portion 433 are connected to each other without going through a curved portion.

When bending forming is performed on the laminate 420 using the forming tool 430, as illustrated in FIG. 30, the composite structure 440 is formed in which no connecting portion exists and an upper surface portion 441 and a side surface portion 443 are directly connected to each other. A cross section in the X-axis direction at the upper surface portion 441 protrudes downward.

Since a method for producing a composite structure in the present embodiment is the same as the method of the third embodiment, a description thereof will be omitted.

In the present embodiment, similarly to the second embodiment, in the forming step, since a force from the end portions toward the central portion in the X-axis direction and a force from the central portion toward the end portions in the X-axis direction cancel each other in the laminate 420, the force along the X-axis direction (force from the central portion toward the end portions in the X-axis direction) is suppressed. Since the force acting on the laminate 420 along the X-axis direction is suppressed, a force acting on the fibers included in the laminate 420 along the X-axis direction is also suppressed. Accordingly, the laminate 420 is unlikely to become a fiber shortage state. Therefore, it is possible to suppress the generation of wrinkles in the laminate 420.

Incidentally, the present disclosure is not limited to each of the above embodiments, and can be appropriately modified without departing from the concept of the present disclosure.

For example, in the first embodiment, the lamination tool 10 to fabricate the laminate 20 and the forming tool 30 to perform bending forming on the laminate 20 may be integrated into one common tool. As one example of the common tool, a portion corresponding to the first adjacent portion 22 of the laminate 20 may be configured to be detachable from the other portion. With such a configuration, it is possible to form a space for performing bending forming on the laminate 20 by removing the portion after the laminate 20 is fabricated. Therefore, both the fabrication and the bending forming of the laminate 20 can be performed with one tool. In addition, also in the second embodiment, the lamination tool 110 and the forming tool 130 may be integrated into one common tool.

In addition, for example, in each of the above embodiments, an example has been described in which a cross section in the Y-axis direction at the deformable portion is curved as in the deformable portion 21 of the first embodiment (refer to FIG. 4) or the deformable portion 121 of the second embodiment (refer to FIG. 15), but the present disclosure is not limited thereto. The cross section in the Y-axis direction at the deformable portion may be bent.

Figure 18:
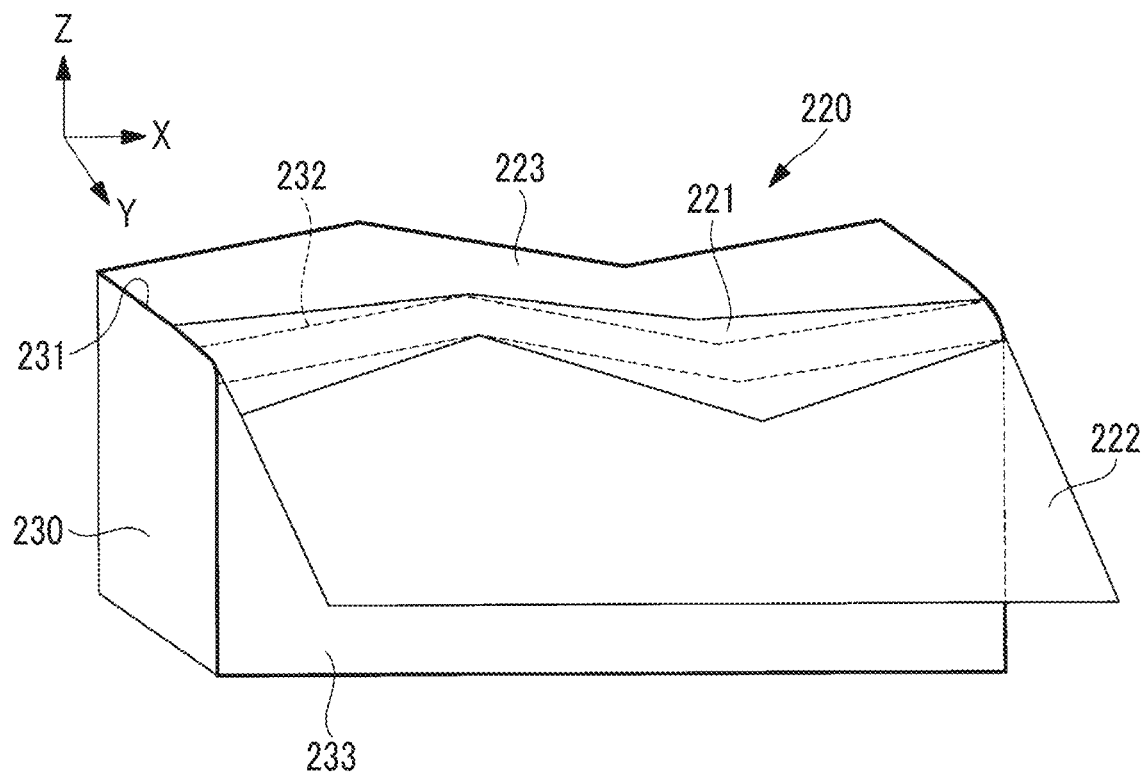
FIG. 18 is a perspective view illustrating a modification example of FIGS. 4 and 15.
Figure 19:
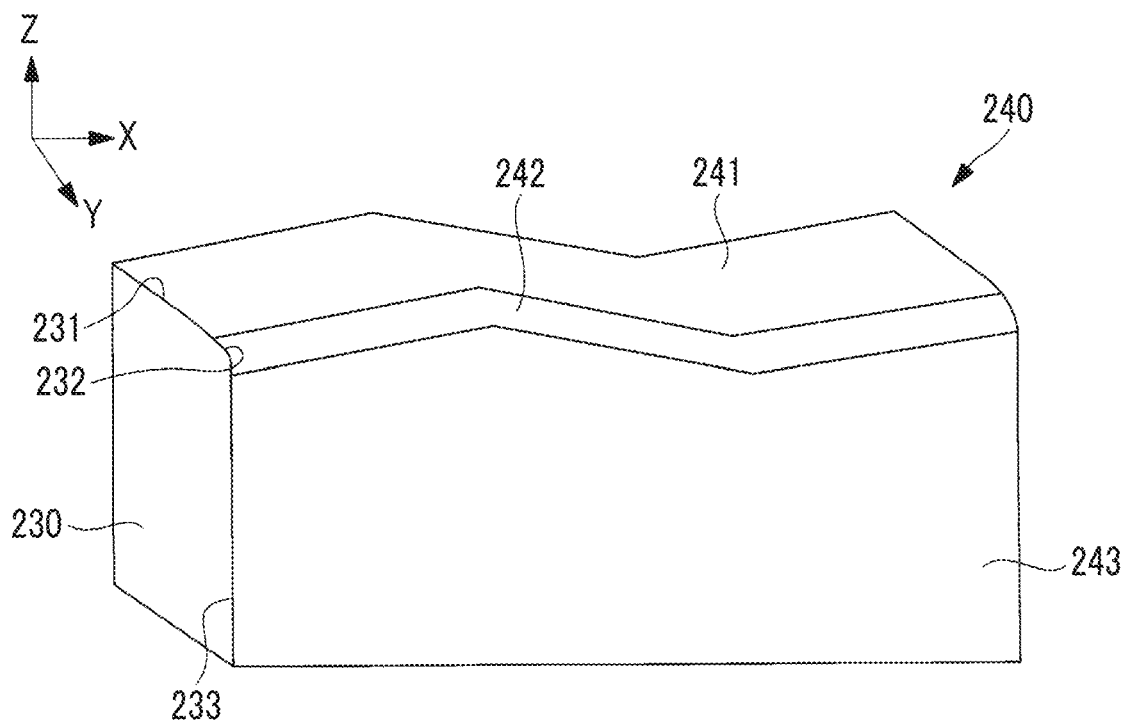
FIG. 19 is a perspective view illustrating a composite structure and a forming tool according to the modification example illustrated in FIG. 18.

In addition, the first embodiment and the second embodiment may be combined. Specifically, as in a deformable portion 221 of a laminate 220 illustrated in FIG. 18, a cross section in the Y-axis direction at a deformable portion may be continuously curved or bent along the X-axis direction. As illustrated in FIG. 18, the deformable portion 221 connects a first adjacent portion 222 and a second adjacent portion 223. In addition, the deformable portion 221 has a shape in which an upward bent portion and a downward bent portion are continuously arranged in the X-axis direction in a cross section in the Y-axis direction. In addition, in the deformable portion 221, a portion having a long length in the Y-axis direction and a portion having a short length in the Y-axis direction are alternately arranged along the X-axis direction. In addition, in this example, a curved portion 232 of a forming tool 230 used to perform bending forming on the laminate 220 connects a placement portion 231 and a vertical portion 233. An upper surface of the curved portion 232 has a shape corresponding to the shape of the deformable portion 221. Specifically, the upper surface of the curved portion 232 has a shape in which an upward bent portion and a downward bent portion are continuous with each other in the X-axis direction in a cross section in the Y-axis direction, and in this example, as illustrated in FIG. 19, a connecting portion 242 of a composite structure 240 produced from the laminate 220 connects an upper surface portion 241 and a side surface portion 243. In addition, the connecting portion 242 has a shape corresponding to the shape of the deformable portion 221. Specifically, the connecting portion 242 has a shape in which an upward bent portion and a downward bent portion are continuous with each other in the X-axis direction in a cross section in the Y-axis direction.

Even in the laminate 220, since the length of the deformable portion 221 in the Y-axis direction changes along the X-axis direction, the force acting on the laminate 220 along the X-axis direction is suppressed. Therefore, the force acting on the fibers included in the laminate 220 along the X-axis direction is also suppressed. Accordingly, the laminate 220 is unlikely to become a fiber shortage state. Therefore, it is possible to suppress the generation of wrinkles in the laminate 220.

In addition, similarly, the third embodiment and the fourth embodiment may be combined. In addition, the third embodiment and the fourth embodiment may be combined with each modification example of the first embodiment.

The method for producing a composite structure and the method for producing a laminate, the laminate, and the lamination tool described in each of the embodiments are identified, for example, as follows.

According to one aspect of the present disclosure, there is provided a method for producing a composite structure (40, 40D, 140) includes: a lamination step of laminating a plurality of fiber sheets to fabricate a laminate (20, 20A, 20B, 20C, 20D, 120) including a deformable portion (21, 21A, 21B, 21C, 21D, 121) extending in one direction (X-axis direction); and a forming step of performing bending forming along a deformation line (21a, 21aC, 121a, 321a, 421a) included in the deformable portion (21, 21A, 21B, 21C, 21D, 121) and extending in the one direction (X-axis direction), to deform the deformable portion (21, 21A, 21B, 21C, 21D, 121). In the lamination step, the laminate is fabricated such that the deformable portion has a shape in which a shape of a cross section in an intersecting direction (Y-axis direction) intersecting the one direction is bent or curved and a length in the intersecting direction changes along the one direction.

In the above configuration, the shape of the cross section in the intersecting direction at the deformable portion is bent or curved. In such a manner, when the deformable portion (deformation line) in which the shape of the cross section in the intersecting direction is bent or curved is bent, a state where the laminate is in excess of the fibers in a region adjacent to the deformable portion in the intersecting direction (hereinafter, also referred to as a "fiber excess state") or of a state where the laminate is in shortage of the fibers therein (hereinafter, also referred to as a "fiber shortage state") may occur. In accordance with the above, when a fiber excess state occurs, a compressive force along the one direction acts in a partial region of the laminate. In addition, when a fiber shortage state occurs, a tensile force along the one direction acts in a partial region of the laminate. When a compressive force or a tensile force along the one direction acts, there is a possibility that wrinkles are generated in the laminate. When wrinkles are generated in the laminate, there is a possibility that the strength of the composite structure is reduced.

In the above configuration, the length of the deformable portion in the intersecting direction changes along the one direction. In other words, the length of the deformable portion in the intersecting direction is not constant along the one direction. The deformation amount of the deformable portion in the forming step changes depending on the length in the intersecting direction. For this reason, in the above configuration, the deformation amount by which the deformable portion is deformed in the forming step differs depending on the position in the one direction. A portion in which the deformation amount is large requires a larger amount of the laminate. For this reason, in the forming step, for example, a force or the like to pull the laminate from a portion in which the deformation amount is small toward a portion in which the deformation amount is large acts on the laminate. In the above configuration, since the deformation amount differs depending on the position in the one direction, a force along the one direction acts in the forming step.

In such a manner, in the above configuration, two forces, namely, a force along the one direction caused by the bending of the deformable portion in which the cross section in the intersecting direction is curved and a force along the one direction caused by a change in the length of the deformable portion in the intersecting direction along the one direction, act on the laminate. For this reason, when the two forces along the one direction cancel each other, the force along the one direction is suppressed. Accordingly, the laminate is unlikely to become a fiber excess state or a fiber shortage state. Therefore, in the forming step, it is possible to suppress the generation of wrinkles in the laminate.

Consequently, it is possible to suppress a reduction in the strength of the composite structure.

Incidentally, a cross section in the one direction means a cross section when the laminate is cut along a plane orthogonal to the one direction. In addition, the cross section in the intersecting direction means a cross section when the laminate is cut along a plane orthogonal to the intersecting direction. In addition, the one direction and the intersecting direction are directions included in a plane intersecting a direction in which the fiber sheets are laminated in the lamination step. In addition, the change in the length of the deformable portion in the intersecting direction means that the length is intentionally made different, and does not include a change in length or the like caused by a production error or the like.

In addition, in the method for producing a composite structure according to one aspect of the present disclosure, in the lamination step, the laminate is fabricated such that the shape of the deformable portion is bent or curved so that the shape of the cross section in the intersecting direction protrudes upward and a length in the intersecting direction at an end portion in the one direction is longer than a length in the intersecting direction at a central portion in the one direction. In the forming step, the bending forming is performed along the deformation line in a direction opposite to a protruding direction of the deformable portion.

In the above configuration, the deformable portion is bent or curved so that the shape of the cross section in the intersecting direction protrudes upward. Accordingly, when the deformable portion is deformed in the forming step, a compressive force along the one direction (force from the end portion toward the central portion in the one direction) acts in a region adjacent to the deformable portion of the laminate in the intersecting direction. Namely, a force to cause a fiber excess state acts.

On the other hand, in the above configuration, the deformable portion has a shape in which the length in the intersecting direction at the end portion in the one direction is longer than the length in the intersecting direction at the central portion in the one direction. Accordingly, the deformation amount by which the deformable portion is deformed in the forming step differs between the end portion and the central portion. Specifically, the deformation amount at the end portion is large, and the deformation amount at the central portion is small. For this reason, in the forming step, a force to pull the laminate from the central portion in which the deformation amount is small toward the end portion in which the deformation amount is large (force from the central portion toward the end portion in the one direction) acts on the laminate.

In such a manner, since a force from the end portion toward the central portion in the one direction and a force from the central portion toward the end portion in the one direction cancel each other, a force along the one direction is suppressed. Accordingly, the laminate is unlikely to become a fiber excess state or a fiber shortage state. Therefore, it is possible to suppress the generation of wrinkles in the laminate. Consequently, it is possible to suppress a reduction in the strength of the composite structure.

In addition, in the method for producing a composite structure according to one aspect of the present disclosure, in the lamination step, the laminate is fabricated such that the shape of the deformable portion is bent or curved so that the shape of the cross section in the intersecting direction protrudes downward and a length in the intersecting direction at an end portion in the one direction is shorter than a length in the intersecting direction at a central portion in the one direction. In the forming step, the bending forming is performed along the deformation line in the same direction as a protruding direction of the deformable portion.

In the above configuration, the deformable portion is bent or curved so that the shape of the cross section in the intersecting direction protrudes downward. Accordingly, when the deformable portion is deformed in the forming step, a tensile force along the one direction (force from the central portion toward the end portion in the one direction) acts in a region adjacent to the deformable portion of the laminate in the intersecting direction. Namely, a force to cause a fiber shortage state acts.

On the other hand, in the above configuration, the deformable portion has a shape in which the length in the intersecting direction at the end portion in the one direction is shorter than the length in the intersecting direction at the central portion in the one direction. Accordingly, the deformation amount by which the deformable portion is deformed in the forming step differs between the end portion and the central portion. Specifically, the deformation amount at the end portion is small, and the deformation amount at the central portion is large. For this reason, in the forming step, a force to pull the laminate from the end portion in which the deformation amount is small toward the central portion in which the deformation amount is large (force from the end portion toward the central portion in the one direction) acts on the laminate.

In such a manner, since a force from the central portion toward the end portion in the one direction and a force from the end portion toward the central portion in the one direction cancel each other, a force along the one direction is suppressed. Accordingly, the laminate is unlikely to become a fiber excess state or a fiber shortage state. Therefore, it is possible to suppress the generation of wrinkles in the laminate. Consequently, it is possible to suppress a reduction in the strength of the composite structure.

In addition, in the method for producing a composite structure according to one aspect of the present disclosure, in the lamination step, the laminate is fabricated such that the deformable portion has a shape in which a shape of a cross section in the one direction is curved and a radius of curvature of the cross section in the one direction at the end portion in the one direction is larger than a radius of curvature of the cross section in the one direction at the central portion in the one direction.

In the above configuration, with regard to the shape of the deformable portion, the shape of the cross section in the one direction is curved. Accordingly, in the forming step, the bending forming can be more suitably performed on the deformable portion.

In addition, in the method for producing a composite structure according to one aspect of the present disclosure, in the lamination step, the laminate is fabricated such that the deformable portion has a shape in which a shape of a cross section in the one direction is curved and a radius of curvature of the cross section in the one direction at the end portion in the one direction is smaller than a radius of curvature of the cross section in the one direction at the central portion in the one direction.

In the above configuration, with regard to the shape of the deformable portion, the shape of the cross section in the one direction is curved. Accordingly, in the forming step, the bending forming can be more suitably performed on the deformable portion.

According to one aspect of the present disclosure, there is provided a method for producing a composite structure (340, 440) includes: a lamination step of laminating a plurality of fiber sheets to fabricate a laminate (300, 400); a deformation step of deforming the laminate to form a deformable portion (321, 421) extending in one direction (X-axis direction); and a forming step of performing bending forming along a deformation line (321a, 421a) included in the deformable portion and extending in the one direction, to deform the deformable portion. In the deformation step, the laminate is deformed such that the deformable portion has a shape in which a shape of a cross section in an intersecting direction (Y-axis direction) intersecting the one direction is bent or curved and a length in the intersecting direction changes along the one direction.

In the above configuration, first, the laminate is deformed to include the deformable portion, and then, bending forming is performed on the laminate including the deformable portion. In addition, the length of the deformable portion in the intersecting direction changes along the one direction. Accordingly, in the forming step, the laminate is unlikely to become a fiber excess state or a fiber shortage state. Therefore, in the forming step, it is possible to suppress the generation of wrinkles in the laminate. Consequently, it is possible to suppress a reduction in the strength of the composite structure.

In addition, in the above configuration, the laminate including the deformable portion is fabricated by laminating the fiber sheets in the lamination step, and then by forming the deformable portion through deforming the laminate. Namely, it is not necessary to form the deformable portion in the laminate in the lamination step. Accordingly, the shape of the laminate to be fabricated in the lamination step can be simplified as compared to a case where a laminate including a deformable portion is fabricated in the lamination step. Therefore, the work in the lamination step can be simplified. Consequently, the cost incurred in the lamination step can be reduced. In addition, the lamination step can be shortened.

In addition, for example, when a laminate having a complicated shape such as including irregularities is fabricated, the laminate may have to be fabricated from fiber sheets each having a thin tape shape. On the other hand, for example, when a laminate having a simple shape such as a flat plate shape is fabricated, the laminate can be fabricated by laminating fiber sheets each having approximately the same area as a projected area of the laminate. In the above configuration, since the shape of the laminate to be fabricated in the lamination step can be simplified, it is possible to improve the degree of freedom in the shape of the fiber sheets forming the laminate.

In addition, when the laminate is processed into a composite structure, a shape change in an in-plane direction of the laminate and deformation in which the laminated fiber sheets slip against each other occur in the laminate.

The shape change in the in-plane direction (hereinafter, referred to as "in-plane deformation") is a shape change occurring in the laminate along the in-plane direction (the X-axis direction and the Y-axis direction). In addition, the deformation in which the laminated fiber sheets slip against each other (hereinafter, referred to as "interlayer slippage") is deformation that occurs because of a difference in length between curved portions of a fiber sheet located on an inner side and of a fiber sheet located on an outer side among the fiber sheets forming the laminate.

In such a manner, when the laminate is processed into a composite structure, the in-plane deformation and the interlayer slippage occur. For this reason, when the step of deforming the laminate is performed in only one stage, the in-plane deformation and the interlayer slippage occur at the same time, so that the shape change of the laminate becomes complicated, and there is a possibility that the laminate is not appropriately deformed. Particularly, there is a possibility that the interlayer slippage is not appropriately performed. When the laminate is not appropriately deformed, there is a possibility that wrinkles are generated in the laminate.

On the other hand, in the above configuration, first, the laminate is deformed to include the deformable portion, and then, bending forming is performed on the laminate including the deformable portion. Namely, the step of deforming the laminate is divided into two stages (the deformation step and the forming step).

In the above configuration, since the laminate is deformed to include the deformable portion in the deformation step, most of the in-plane deformation is performed in the deformation step that is an initial bending step. On the other hand, since the in-plane deformation has already been performed in the deformation step, almost no in-plane deformation is performed in the forming step. From the above, in the forming step, the interlayer slippage is mainly performed, and almost no in-plane deformation is performed.

In such a manner, in the present embodiment, the step of performing the in-plane deformation and the step of performing the interlayer slippage can be set as different steps. Therefore, since the shape change of the laminate is relatively simplified, the laminate can be appropriately deformed. Therefore, since the generation of wrinkles can be suppressed, it is possible to suppress a reduction in the strength of the composite structure.

In addition, generally, in order to improve the strength of a laminate, the laminate in which a plurality of fiber sheets are laminated is formed by laminating the fiber sheets having different extending directions of fibers. The fiber sheet is easy to elongate in a direction orthogonal to the fibers and is difficult to elongate in the extending direction of the fibers. Therefore, when bending forming is performed on the laminate, the elongation direction (direction in which the elongation amount is large) differs for each of the laminated fiber sheets. In such a manner, the elongation direction differs for each of the laminated fiber sheets, so that friction occurs between the fiber sheets (hereinafter, referred to as "interlayer"). The interlayer friction is a cause of the generation of wrinkles in the laminate.

In the above configuration, as described above, the step of deforming the laminate is divided into two stages. Accordingly, the deformation amount of the laminate in each step can be reduced. Since the deformation amount of the laminate in each step is reduced, the elongation amount of each fiber sheet in each step is also reduced. When each fiber sheet is elongated, even in the case of the same elongation amount, the interlayer friction is smaller when a small amount of elongation is performed a plurality of times than when a large amount of elongation is performed at once. Therefore, in the above configuration, it is possible to suppress interlayer friction as compared to a case where the step of deforming the laminate is not divided. Consequently, since the generation of wrinkles in the laminate can be suppressed, it is possible to suppress a reduction in the strength of the composite structure.

According to one aspect of the present disclosure, there is provided a method for producing a laminate (20, 20A, 20B, 20C, 20D, 120) that is processed into a composite structure (40, 40D, 140) by being subjected to bending forming, the method including: a lamination step of laminating a plurality of fiber sheets to include a deformable portion (21, 21A, 21B, 21C, 21D, 121) extending in one direction. In the lamination step, the laminate is produced such that the deformable portion has a shape in which a shape of a cross section in the one direction and a shape of a cross section in an intersecting direction intersecting the one direction is bent or curved and a length in the intersecting direction changes along the one direction.

In the above configuration, the produced laminate includes the deformable portion. Even when bending forming is performed along a deformation line included in the deformable portion and extending in the one direction, to deform the deformable portion of the laminate, in a case where two forces acting on the laminate along the one direction cancel each other, a force along the one direction is suppressed. Accordingly, the laminate is unlikely to become a fiber excess state or a fiber shortage state. Therefore, it is possible to suppress the generation of wrinkles in the laminate. Consequently, it is possible to suppress a reduction in the strength of the composite structure produced from the laminate.

In the method for producing a laminate according to one aspect of the present disclosure, in the lamination step, the laminate is produced such that the shape of the deformable portion is bent or curved so that the shape of the cross section in the intersecting direction protrudes upward and a length in the intersecting direction at an end portion in the one direction is longer than a length in the intersecting direction at a central portion in the one direction.

In the above configuration, when the produced laminate is deformed, since a force from the end portion toward the central portion in the one direction and a force from the central portion toward the end portion in the one direction cancel each other, a force along the one direction is suppressed. Accordingly, the laminate is unlikely to become a fiber excess state or a fiber shortage state. Therefore, it is possible to suppress the generation of wrinkles in the laminate. Consequently, it is possible to suppress a reduction in the strength of the composite structure.

In the method for producing a laminate according to one aspect of the present disclosure, in the lamination step, the laminate is produced such that the shape of the deformable portion is bent or curved so that the shape of the cross section in the intersecting direction protrudes downward and a length in the intersecting direction at an end portion in the one direction is shorter than a length in the intersecting direction at a central portion in the one direction.

In the above configuration, when the produced laminate is deformed, since a force from the central portion toward the end portion in the one direction and a force from the end portion toward the central portion in the one direction cancel each other, a force along the one direction is suppressed. Accordingly, the laminate is unlikely to become a fiber excess state or a fiber shortage state. Therefore, it is possible to suppress the generation of wrinkles in the laminate. Consequently, it is possible to suppress a reduction in the strength of the composite structure.

According to one aspect of the present disclosure, there is provided a method for producing a laminate that is processed into a composite structure by being subjected to bending forming, the method including: a lamination step of laminating a plurality of fiber sheets; and a deformation step of deforming the plurality of fiber sheets laminated in the lamination step, to form a deformable portion extending in one direction. In the deformation step, the plurality of fiber sheets are deformed such that the deformable portion has a shape in which a shape of a cross section in an intersecting direction intersecting the one direction is bent or curved and a length in the intersecting direction changes along the one direction.

In the above configuration, the produced laminate includes the deformable portion. Accordingly, even when bending forming is performed along a deformation line included in the deformable portion and extending in the one direction, to deform the deformable portion of the laminate, the laminate is unlikely to become a fiber excess state or a fiber shortage state. Therefore, it is possible to suppress the generation of wrinkles in the laminate. Consequently, it is possible to suppress a reduction in the strength of the composite structure produced from the laminate.

In addition, the shape of the laminate to be fabricated in the lamination step can be simplified as compared to a case where a laminate including a deformable portion is fabricated in the lamination step. Therefore, the work in the lamination step can be simplified. Consequently, the cost incurred in the lamination step can be reduced. In addition, the lamination step can be shortened. In addition, since the shape of the laminate to be fabricated in the lamination step can be simplified, it is possible to improve the degree of freedom in the shape of the fiber sheets forming the laminate.

According to one aspect of the present disclosure, there is provided a laminate (20, 20A, 20B, 20C, 20D, 120) that is fabricated by laminating a plurality of fiber sheets and that is processed into a composite structure (40, 40D, 140) by being subjected to bending forming, the laminate including: a deformable portion (21, 21A, 21B, 21C, 21D, 121) which extends in one direction and in which a shape of a cross section in an intersecting direction intersecting the one direction is bent or curved and a length in the intersecting direction changes along the one direction.

In the above configuration, even when bending forming is performed along a deformation line included in the deformable portion and extending in the one direction, to deform the deformable portion of the laminate, in a case where two forces acting on the laminate along the one direction cancel each other, a force along the one direction is suppressed. Accordingly, the laminate is unlikely to become a fiber excess state or a fiber shortage state. Therefore, it is possible to suppress the generation of wrinkles in the laminate. Consequently, it is possible to suppress a reduction in the strength of the composite structure produced from the laminate.

In addition, in the laminate according to one aspect of the present disclosure, the deformable portion is bent or curved so that the cross section in the intersecting direction protrudes upward and a length in the intersecting direction at an end portion in the one direction is longer than a length in the intersecting direction at a central portion in the one direction.

In the above configuration, even when the laminate is deformed, since a force from the end portion toward the central portion in the one direction and a force from the central portion toward the end portion in the one direction cancel each other, a force along the one direction is suppressed. Accordingly, the laminate is unlikely to become a fiber excess state or a fiber shortage state. Therefore, it is possible to suppress the generation of wrinkles in the laminate. Consequently, it is possible to suppress a reduction in the strength of the composite structure.

In addition, in the laminate according to one aspect of the present disclosure, the deformable portion is bent or curved so that the cross section in the intersecting direction protrudes downward and a length in the intersecting direction at an end portion in the one direction is shorter than a length in the intersecting direction at a central portion in the one direction.

In the above configuration, even when the laminate is deformed, since a force from the central portion toward the end portion in the one direction and a force from the end portion toward the central portion in the one direction cancel each other, a force along the one direction is suppressed. Accordingly, the laminate is unlikely to become a fiber excess state or a fiber shortage state. Therefore, it is possible to suppress the generation of wrinkles in the laminate. Consequently, it is possible to suppress a reduction in the strength of the composite structure.

According to one aspect of the present disclosure, there is provided a lamination tool (10, 110) that fabricates a laminate (20, 20A, 20B, 20C, 20D, 120) that includes a plurality of fiber sheets to be laminated and that is processed into a composite structure (40, 40D, 140), the tool including: a lamination surface (11) on which the fiber sheets are placed. The lamination surface has a curved surface portion (12, 112) which extends in one direction and in which a shape of a cross section in an intersecting direction intersecting the one direction is bent or curved and a length in the intersecting direction changes along the one direction.

In addition, in the lamination tool according to one aspect of the present disclosure, the curved surface portion is curved so that the cross section in the intersecting direction protrudes upward and a length in the intersecting direction at an end portion in the one direction is longer than a length in the intersecting direction at a central portion in the one direction.

In addition, in the lamination tool according to one aspect of the present disclosure, the curved surface portion is curved so that the cross section in the intersecting direction protrudes downward and a length in the intersecting direction at an end portion in the one direction is shorter than a length in the intersecting direction at a central portion in the one direction.

REFERENCE SIGNS LIST

10: Lamination tool
11: Lamination surface
12: First surface portion (curved surface portion)
13: Second surface portion
14: Third surface portion
20: Laminate
21: Deformable portion
21a: Deformation line
22: First adjacent portion
23: Second adjacent portion
30: Forming tool
31: Placement portion
32: Curved portion
33: Vertical portion
40: Composite structure
41: Upper surface portion
42: Connecting portion
43: Side surface portion
112: First surface portion (curved surface portion)
113: Second surface portion
114: Third surface portion
120: Laminate
121: Deformable portion
122: First adjacent portion
123: Second adjacent portion
130: Forming tool
131: Placement portion
132: Curved portion
140: Composite structure
141: Upper surface portion
142: Connecting portion
W: Wrinkle

The invention claimed is:

1. A method for producing a composite structure, the method comprising:
   a lamination step of laminating a plurality of fiber sheets to fabricate a laminate including a deformable portion extending in one direction; and
   a forming step of performing bending forming along a deformation line included in the deformable portion and extending in the one direction, to deform the deformable portion,
   wherein the deformable portion is provided between a first adjacent portion and a second adjacent portion adjacent to each other, and after the forming step, the deformable portion becomes a connecting portion having an arc shape provided between the first adjacent portion and the second adjacent portion,
   in the lamination step, the laminate is fabricated such that the deformable portion has a shape in which a shape of a cross section in a laminating direction of the laminate and in an intersecting direction intersecting the one direction is bent or curved and a length in the intersecting direction changes along the one direction, and
   in the forming step, the laminate is formed such that a length of the connecting portion in the intersecting direction is uniform along one direction.

2. The method for producing a composite structure according to claim 1,
   wherein in the lamination step, the laminate is fabricated such that the shape of the deformable portion is bent or curved so that the shape of the cross section in the intersecting direction protrudes upward and a length in the intersecting direction at an end portion in the one direction is longer than a length in the intersecting direction at a central portion in the one direction, and
   in the forming step, the bending forming is performed along the deformation line in a direction opposite to a protruding direction of the deformable portion.

3. The method for producing a composite structure according to claim 1,
   wherein in the lamination step, the laminate is fabricated such that the shape of the deformable portion is bent or curved so that the shape of the cross section in the intersecting direction protrudes downward and a length in the intersecting direction at an end portion in the one direction is shorter than a length in the intersecting direction at a central portion in the one direction, and
   in the forming step, the bending forming is performed along the deformation line in the same direction as a protruding direction of the deformable portion.

4. The method for producing a composite structure according to claim 2,
   wherein in the lamination step, the laminate is fabricated such that the deformable portion has a shape in which a shape of a cross section in the one direction is curved and a radius of curvature of the cross section in the one direction at the end portion in the one direction is larger than a radius of curvature of the cross section in the one direction at the central portion in the one direction.

5. The method for producing a composite structure according to claim 3,
   wherein in the lamination step, the laminate is fabricated such that the deformable portion has a shape in which a shape of a cross section in the one direction is curved and a radius of curvature of the cross section in the one direction at the end portion in the one direction is smaller than a radius of curvature of the cross section in the one direction at the central portion in the one direction.

6. A method for producing a composite structure, the method comprising:
   a lamination step of laminating a plurality of fiber sheets to fabricate a laminate;
   a deformation step of deforming the laminate to form a deformable portion extending in one direction; and
   a forming step of performing bending forming along a deformation line included in the deformable portion and extending in the one direction, to deform the deformable portion,
   wherein the deformable portion is provided between a first adjacent portion and a second adjacent portion adjacent to each other, and after the forming step, the deformable portion becomes a connecting portion having an arc shape provided between the first adjacent portion and the second adjacent portion,
   in the deformation step, the laminate is deformed such that the deformable portion has a shape in which a shape of a cross section in a laminating direction of the laminate and in an intersecting direction intersecting the one direction is bent or curved and a length in the intersecting direction changes along the one direction, and
   in the forming step, the laminate is formed such that a length of the connecting portion in the intersecting direction is uniform along one direction.

* * * * *